(12) United States Patent
Gielis et al.

(10) Patent No.: US 8,818,771 B2
(45) Date of Patent: Aug. 26, 2014

(54) COMPUTER IMPLEMENTED TOOL BOX SYSTEMS AND METHODS

(76) Inventors: Johan Gielis, Antwerp (BE); Diego Caratelli, Delft (NL)

( * ) Notice: Subject to any disclaimer, the term of this patent is extended or adjusted under 35 U.S.C. 154(b) by 201 days.

(21) Appl. No.: 13/165,240

(22) Filed: Jun. 21, 2011

(65) Prior Publication Data

US 2012/0041728 A1    Feb. 16, 2012

Related U.S. Application Data

(60) Provisional application No. 61/356,836, filed on Jun. 21, 2010.

(51) Int. Cl.
*G06F 17/50*    (2006.01)

(52) U.S. Cl.
USPC ............... 703/2; 703/5; 708/270; 708/276; 345/440

(58) Field of Classification Search
USPC ............ 703/2, 5; 708/270, 276; 345/440
See application file for complete search history.

(56) References Cited

U.S. PATENT DOCUMENTS

| 5,133,052 | A  | * | 7/1992  | Bier et al. ............ | 715/234 |
| 7,620,527 | B1 | * | 11/2009 | Gielis ................... | 703/2 |
| 2006/0155398 | A1 | * | 7/2006 | Hoffberg et al. ....... | 700/86 |

OTHER PUBLICATIONS

Notification of Transmittal of the International Search Report and the Written Opinion of the International Searching Authority, or the Declaration (Form PCT/ISA/220) dated Nov. 29, 2013, issued in International Application No. PCT/IB2011/002194 with Forms PCT/ISA/210 and PCT/ISA/237.
Transmittal of International Preliinary Report on Patentability of PCT/IB2011/002194 (form PCT/IB/326) dated Jan. 16, 2014, with forms PCT/IB/373 and PCT/ISA/237, (7 pages).

* cited by examiner

*Primary Examiner* — Thai Phan
(74) *Attorney, Agent, or Firm* — Westerman, Hattori, Daniels & Adrian, LLP

(57) ABSTRACT

According to the preferred embodiments, a system or method is provided that involves the programming of a computer or other processing device with a software, hardware or firmware configured to create a processing tool (i.e., referred to herein as a tool box) that can be configured to provide one or more operational function based on new mathematical principles described herein for the purposes of, e.g., synthesizing or analyzing shapes and the like.

13 Claims, 7 Drawing Sheets

S1: Modify Individual Functions
S1A: Modify the developable function DF
= power of rose curve (DF^n) 

S1B: modify the Constraining function CF (= SF)
= power of SF function (CF^n) 

S2: Multiplication of CF and DF
= product of DF and CF 

S3: Addition of developable and constraining function.
= αDF + (1-α) CF with 0 ≤ α ≤ 1. 

FIG. 10

S1 + S2: increase DF and impose constraining geometry 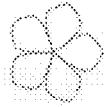

S1 + S3: increase DF and fuse parts 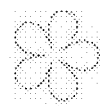

S2 + S3: impose CF and fuse parts 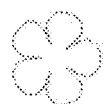

S1 + S2 + S3: increase DF, impose CF and Fuse Parts 

US 8,818,771 B2

COMPUTER IMPLEMENTED TOOL BOX SYSTEMS AND METHODS

The present application is a non-provisional of U.S. Provisional Application No. 61/356,836 entitled Computer Implemented Tool Box to Johan Gielis, filed on Jun. 21, 2010, the entire contents of which is incorporated herein by reference as though recited herein in full.

INTRODUCTION

The present invention improves upon the subject matter disclosed in U.S. Pat. No. 7,620,527 issued on Nov. 17, 2009 to a present inventor, Johan Gielis, the entire contents of which patent is incorporated herein by reference as though recited herein in full.

The '527 Patent describes systems and methods by which patterns (e.g., such as images, waveforms such as sounds, electromagnetic waves, or other signals, etc.) are synthesized, modulated and/or analyzed through the use of a computer programmed with a novel mathematical formula. The formula can be used to create a variety of shapes, waveforms, and other representations. The formula greatly enhances ability in computer operations and provides a great savings in computer memory and a substantial increase in computing power.

The geometric concept of the '527 patent is useful for modelling and for explaining why certain natural shapes and forms grow as they do. As explained in the '527 patent, the inventor therein found that most of the conventional geometrical forms and regular shapes, including circles and polygons, can be described as special realizations of the following formula:

$$r = \cfrac{1}{\sqrt[n_1]{\left|\cfrac{1}{a}\cdot\cos\cfrac{m_1\cdot\phi}{4}\right|^{n_2} \pm \left|\cfrac{1}{b}\cdot\sin\cfrac{m_2\cdot\phi}{4}\right|^{n_3}}}$$

(for a, b, $n_i$ and $m_i \in \Re^+$) (where a and b are not equal zero)

The '527 patent explains how this formula and representations thereof can be utilized, for example, in both the "synthesis" and "analysis" of patterns (i.e., including for example image patterns and waveforms such as electromagnetic (e.g., electricity, light, etc.), sound and other waveforms or signal patterns) and the like.

In order to synthesize various patterns, the parameters in this equation can be modified so that a variety of patterns can be synthesized. Notably, the parameters $m_1$, $m_2$, $n_1$, $n_2$, $n_3$, a and/or b can be moderated. By moderating or modulating the number of rotational symmetries ($m_i$), exponents ($n_i$), and/or short and long axes (a and b), a wide variety of natural, human-made and abstract shapes can be created.

FIG. 1 is a reproduction from the '527 patent of a schematic diagram showing various components that can be included in various embodiments for the synthesis of patterns and/or for the analysis of patterns with the super-formula operator. As described in the '527 patent, according to the first aspect, for illustrative purposes with reference to [FIG. 1], shapes or waves can be "synthesized" by the application of the following exemplary basic steps: In a first step, a choice of parameters is made (e.g., by either inputting values into the computer 10, i.e., via a keyboard 20, a touch screen, a mouse-pointer, a voice recognition device or other input device or the like, or by having the computer 10 designate values), and the computer 10 is used to synthesize a selected super-shape based on the choice of parameters. In a second optional step, the super-formula can be used to adapt the selected shapes, to calculate optimization, etc. This step can include use of: graphics programs (e.g., 2D, 3D, etc.); CAD software; finite element analysis programs; wave generation programs; or other software. In a third step, the output from the first or second step is used to transform the computerized super-shapes into a physical form, such as via: (a) displaying the super-shapes 31 on a monitor 30, printing the super-shapes 51 upon stock material 52 such as paper from a printer 50 (2-D or 3-D); (b) performing computer aided manufacturing (e.g., by controlling an external device 60, such as machinery, robots, etc., based on the output of step three); (c) generating sound 71 via a speaker system 70 or the like; (d) performing stereolithography; (e) performing rapid prototyping; and/or (f) utilizing the output in another manner known in the art for transforming such shapes.

The '527 patent discusses both synthesis (such as, e.g., creation of shapes) and analysis (such as, e.g., the analysis of shapes). With respect to analysis, the '527 patent explains that: "In general, although not limited thereto, shapes or waves can be "analyzed" by the application of the following basic steps (these steps have similarities to the foregoing steps in synthesis in reverse): In a first step, a pattern can be scanned or input into a computer (e.g., in a digital form). For example, an image of an object may be scanned (2-D or 3-D), a microphone may receive sound waves, or electrical signals (e.g., waves) may be input, data from a computer readable medium such as, e.g., a CD-ROM, a diskette, etc., may be input, data may be received on-line, such as via the Internet or an Intranet, etc. Various other known input techniques could be used, such as, for example, using digital or other cameras (e.g., whether single picture or continuous real time, etc.), etc. [FIG. 1] illustrates examples wherein an image scanner 100 (e.g., a document scanner utilized to scan images on stock material such as paper or photographs, or another scanner device) and/or a recorder 200 (e.g., which receives waveforms via a microphone or the like) are utilized in conjunction with the computer 10. In a second step, the image is analyzed to determine parameter values, etc., of the super-formula. In this step, the analyzed signals could also be identified, categorized, compared, etc. In some computer analysis cases, the computer can include a library or catalogue (e.g., stored in a memory) of primitives (e.g., categorizing assorted super-shapes by parameter values). In such latter cases, the computer can then be used to approximate, identify, classify and/or the like the supershapes based on the information in the library or catalogue. The catalogue of primitives could be used, for example, for the first approximation of patterns or shapes. In a third optional step, the analyzed signals can be moderated as desired (e.g., operations can be performed similar to that described above with reference to the second general phase or step of synthesis). In a fourth step, an output can be created. The output can include: (a) providing a visual (e.g., displayed or printed) or an audible (e.g., sound) output; (b) controlling the operation of a particular device (e.g., if certain conditions are determined); (c) providing an indication related to the analyzed pattern (e.g., identifying it, classifying it, identifying a preferred or optimal configuration, identifying a defect or abnormality, etc.); (d) creating another form of output or result as would be apparent to those in the art. In the analysis, after the pattern is digitized, the computer proceeds using a certain type of representation. If it is a chemistry pattern, the XY graph should be selected. If it is a closed shape, a modified Fourier analysis should be selected. The computer should be adapted (e.g., via software) to provide an estimation of the right parameters for the equation to represent the digitized pattern.

Although the '527 patent sets forth noteworthy advances in technology, over the last decade, the present inventors have discovered some noteworthy advances and improvements which are the subject matter of the present application.

BACKGROUND REFERENCES

In addition, the following references are cited for general background information, the entire contents of each of the below references being incorporated herein by reference in their entireties.

1. Gielis, J. A generic geometric transformation that unifies a large range of natural and abstract shapes. *American Journal of Botany* 90(3) Invited Special Paper, 333-338 (2003).
2. Bera, N., Bhattacharjee, J. K., Mitra, S. & Khastgir, S. P. Energy levels of a particle confined in a supercircular box. *The European Physical Journal D* 46, 41-50 (2008).
3. Richardson, J. S. et al. RNA Backbone: Consensus all-angle conformers and modular string nomenclature. *RNA* 14, 465-481 (2008).
4. Guitart, R. Les coordonnées curvilignes de Gabriel Lamé, réprésentations des situation physiques et nouveaux objects mathématiques. In: Gabriel Lamé: Les pérégrinations d'un ingénieur du XIXe siécle. Actes du Colloque. SABIX N° 44, 119-129 (2009).
5. Gielis, J., Beirinckx, B. & Bastiaens, E. Superquadrics with rational and irrational symmetries. In: (Elber G. and Shapiro V., Eds). Proceedings of the 8th ACM Symposium on Solid Modeling and Applications, Seattle, Jun. 16-20, 2003, 262-265 (2003).
6. Ulrich, W. Decomposing the process of species accumulation into area dependent and time dependent parts. *Ecological Research* 21(4), 578-585 (2006).
7. Fougerolle, Y. D., Gribok, A., Foufou, S., Trucheret, F. & Abidi M. A. Boolean Operations with Implicit and Parametric Representation of Primitives Using R-Functions. *IEEE Transactions on Visualization and Computer Graphics* 11(5), 529-539 (2005).
8. Johnson, J. E., Starkey, R. P. & Lewis, M. J. Aerodynamic stability of reentry heat shield shapes for a crew exploration vehicle. *Journal of Spacecraft and Rockets* 43 (4), 721-730 (2006).
9. Gielis, J., Haesen, S. & Verstraelen, L. Universal shapes: from the supereggs of Piet Hein to the cosmic egg of George Lemaître. *Kragujevac Journal of Mathematics* 28, 55-67 (2005).
10. Haesen, S. & Verstraelen, L. Curvature and Symmetries of Parallel Transport (Chapter 8) and Extrinsic Symmetries of Parallel Transport (Chapter 9) In: M. Boucetta and J.-M. Morvan (Eds) Differential Geometry and Topology, Discrete and Computational Geometry: Volume 197 NATO Science Series: Computer & Systems Sciences (2005).
11. Koiso, M. & Palmer, B. Equilibria for anisotropic energies and the Gielis Formula. *Forma* (Society for Science on Form, Japan) 23(1), 1-8 (2008).
12. Calhoun, D. A. & Helzel, C. A finite volume method for solving parabolic equations on logically Cartesian curved surface meshes. *SIAM J. Sci. Comp.* 31(6), 4066-4099 (2009).
13. Natalini, P., Patrizi, R. & Ricci, P. E. The Dirichlet problem for the Laplace equation in a starlike domain of a Riemann surface. *Numer. Algor.* DOI 10.1007/s11075-008-9201-z (2008).
14. Gielis, J., Caratelli, D., Haesen, S. & Ricci, P. E. Rational mechanics and Science Rationelle Unique. In: Paipetis, S., Ceccarelli, M. (Eds.) The Genius of Archimedes: 23 centuries of influence on mathematics, science and engineering. Springer Verlag, HMMS Series 11, 29-43 (2010).
15. Lamé, G. Examen de differentes méthodes employées pour résoudre les problèmes de géometrie. M. V. Courcier imprimeur Libraire, Paris (1818).
16. Thompson, A. C. *Minkowski geometry*, Encyclopedia of Mathematics and its Applications, Vol. 63, Cambridge University Press, Cambridge (1996).
17. Chern, S.-S. Back to Riemann. In: Mathematics: Frontiers and Perspectives 2000. International Mathematical Union, 33-34 (2000).
18. Yajima, T. & Nagahama, Y. Finsler geometry of seismic ray path in anisotropic media. *Proc. R. Soc. A* 465, 1763-1777 (2009).
19. Berger, M. A panoramic view of Riemannian geometry. Springer Verlag (2003).
20. Verstraelen, L. Philosophiae Naturalis Principia Geometrica I. *Bull. Transilvania Univ. Brasov* 14(49) Proc. Conf. RIGA 2007, dedicated to Radu Rosca, 335-351 (2007).
21. Thom, R. Structural stability and morphogenesis. Benjamin (1972).
22. Loria, G. Spezielle algebraische und transscendente ebene Kurven: Theorie und Geschichte. Teubner G. B. Verlag (1902).
23. West, G. B., Brown, J. H. & Enquist, B. J. A general model for the origin of allometric scaling laws in biology. *Science* 276, 122-126 (1997).
24. West, G. B., Brown, J. H. & Enquist, B. J. The fourth dimension of life: fractal geometry and allometric scaling of organisms. *Science* 284, 1677-1679 (1999).
25. Verstraelen, L. On Natural Geometric Symmetries. Dedicated to the memory of Katsumi Nomizu. Murcia (Spain) Workshop "Differential Geometry and Submanifolds" Departamento de Matemáticas, Universidad de Murcia Nov. 18-20 (2008).
26. D'Arcy Thompson, W. On Growth and Form. Cambridge University Press (1917).
27. Colding, T. H. & Minicozzi W. P. Shapes of embedded minimal surfaces. *PNAS*, Jul. 25: 11106-11111 (2006).
28. Koiso, M. & Palmer B. Rolling constructions for anisotropic Delaunay surfaces. *Pacific Journal of Mathematics* 2, 345-378 (2008).
29. Palmer B. Geometry of materials. Simon Stevin Transactions on Geometry 1, 117-129, Tilburg, The Netherlands (2010).
30. Libbrecht K. The physics of snow crystals. *Reports on Progress in Physics* 68, 855-895 (2005).
31. Suslov, D & Verbelen, J.-P. Cellulose orientation determines mechanical anisotropy in onion epidermal cell walls. *Journal of Experimental Botany* 57(10), 2183-2192 (2006).
32. Hamant, O., et al. Developmental Patterning by Mechanical Signals in *Arabidopsis*. *Science* 322, 1650-1655 (2008).
33. Chen B. Y. Total mean curvature and submanifolds and finite type curves. Series in Pure Mathematics Vol. 1. World Scientific (1984).

34. Verstraelen L. Curves and surfaces of finite Chen type. Geometry and Topology of Submanifolds III, World Scientific, Singapore, 304-311 (1991).
35. Caratelli, D., Natalini, P., Ricci P. E. & Yarovoy A. The Neumann problem for the Helmholtz equation in a star-like planar domain. *Applied Mathematics and Computation* 216(2), 556-564 (2010).
36. Caratelli, D., Natalini, P. & Ricci, P. E. Fourier solution of the wave equation for a starlike shaped vibrating membrane. *Computers and Mathematics with Applications* 59, 176-184 (2010).
37. Fougerolle, Y. D., Trucheret, F. & Gielis, J. A new potential function for self intersecting Gielis curves with rational symmetries. In: Proceedings of GRAPP 2009—International Conference on Computer Graphics Theory and Applications—Lisboa, Feb. 5-8, 2009.
38. Verstraelen L. Philosophiae Naturalis Principia Geometrica II Radu Rosca in memoriam, unpublished & pers.comm.
39. Chern, S. S. Introduction. In: Dillen, F. and Verstraelen, L. (Eds.), Handbook of Differential Geometry 1, North-Holland, Amsterdam (2000).
40. Einstein, A. On the method of Theoretical Physics. The Herbert Spencer Lecture, delivered at Oxford, Jun. 10, 1933. Oxford University Press (1933).

In this application below, references to the above-referenced background articles are made numerically within the text as notes (such as, e.g., reference to article 1 by a superscript[1].

SUMMARY

The preferred embodiments of the present invention have been developed in view of the above-mentioned and/or other problems in the related art. The preferred embodiments of the present invention can significantly improve upon existing methods and/or apparatuses.

According to the preferred embodiments, a system and/or method is provided that involves the programming of a computer or other processing device with a software, hardware and/or firmware configured to create a processing tool (i.e., referred to herein as a tool box) that can be configured to provide one or more operational function based on new mathematical principles described herein for the purposes of, e.g., synthesizing and/or analyzing shapes and the like.

According to a first embodiment, a method of synthesizing or analyzing shapes is provided that includes:

a) providing a computer tool box programmed to solve the following equation $$\rho = R(\vartheta) = \sum_{j=0}^{k} r_G(\vartheta; \gamma_j(\vartheta), m_j, a_j, b_j, n_{1j}, n_{2j}, n_{3j}),$$

where $$r_G(\vartheta; \gamma(\vartheta), a, b, m, n_1, n_2, n_3) = \gamma(\vartheta) \cdot \left[ \left| \frac{1}{a} \cdot \cos\frac{m}{4}\vartheta \right|^{n_2} + \left| \frac{1}{b} \cdot \sin\frac{m}{4}\vartheta \right|^{n_3} \right]^{-1/n_1};$$

and b) using the computer tool box to synthesize or analyze shapes with said equation.

According to another embodiment, a computer tool box for synthesizing or analyzing shapes is provided that includes:

a) a computer programmed to solve the following equation $$\rho = R(\vartheta) = \sum_{j=0}^{k} r_G(\vartheta; \gamma_j(\vartheta), m_j, a_j, b_j, n_{1j}, n_{2j}, n_{3j}),$$

where $$r_G(\vartheta; \gamma(\vartheta), a, b, m, n_1, n_2, n_3) = \gamma(\vartheta) \cdot \left[ \left| \frac{1}{a} \cdot \cos\frac{m}{4}\vartheta \right|^{n_2} + \left| \frac{1}{b} \cdot \sin\frac{m}{4}\vartheta \right|^{n_3} \right]^{-1/n_1};$$

and b) said computer being configured to synthesize or analyze shapes using said equation.

In some examples, the method or system further includes using the computer tool box to synthesize shapes using said equation along with linear interpolation between terms. In some examples, the method or system further includes using the computer tool box to synthesize k-type curves using said equation. In some examples, the method or system further includes using the computer tool box to synthesize k-type surfaces using said equation. In some examples, the method or system further includes clustering data in a database and using the computer tool box to perform data-mining of said clustered data using said equation. In some examples, the method or system further includes using the computer tool box to perform computation employing said equation. In some examples, the method or system further includes that said computation involves mesh free modelling. In some examples, the method or system further includes that said computation involves optimal design of products.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

BRIEF DESCRIPTION OF THE DRAWINGS

The preferred embodiments of the present invention are shown by way of example, and not limitation, in the accompanying figures, in which:

With reference to FIGS. 5(A)-5(C)

FIG. 9 is a chart illustrating three basic strategies related to linear interpolation, and FIG. 10 is a chart illustrating a combination of three basic strategies related to linear interpolation.

DISCUSSION OF THE PREFERRED EMBODIMENTS

Figure 1:
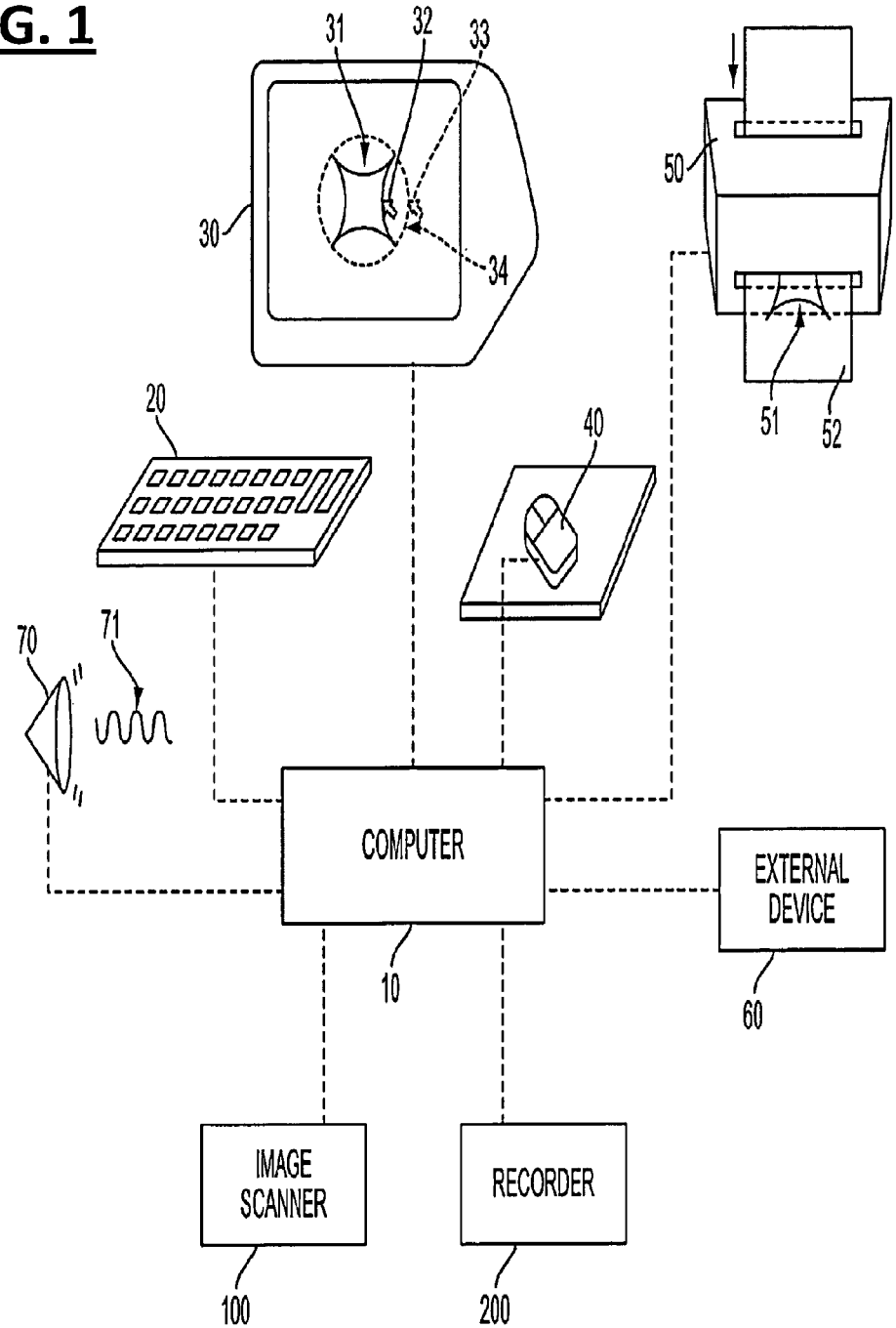
FIG. 1 is a reproduction from the '527 patent of a schematic diagram showing various components that can be included in various embodiments for the synthesis of patterns and/or for the analysis of patterns (i.e., which components can similarly be used to implement embodiments of the present application).

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. Universal Natural Shapes: Towards a Geometrization of Everything:

Gielis curves, surfaces and (sub-) manifolds are generalizations of Lamé curves. They enable a unique and uniform description of a plethora of natural shapes[1] with a wide array of applications in science[2,3,4] and technology[5,6,7,8]. These curves and surfaces efficiently model shapes as diverse as cells, crystals and galaxies, DNA molecules and flowers; they therefore are referred to as Universal Natural Shapes[9,10]. Here we describe how, beyond the mere descriptive, these curves, surfaces and submanifolds can be used to understand natural shapes geometrically as physical submanifolds minimizing tension from the surrounding space. They turn out to be the most natural Euclidean curves and surfaces. This is shown by the occurrence of constant anisotropic mean curvature surfaces[11] in nature. Moreover, these transformations allow the development of general computational methods for solving partial differential equations based on logically Cartesian curved surface meshes[12] or with a semi-Fourier method[13]. The use of Fourier series to solve PDE's on any normal polar domain in 2D and 3D, is extended in this paper to include generalized Fourier series and k-type curves, thereby combining the work of Lamé and Fourier[14], applicable in all domains of science and technology.

2. Universal Natural Shapes:

The definition of a unifying description of natural objects and phenomena and the symmetries underlying this description is the holy grail of geometry. Symmetry (-μετρια) means proportion or right balance, and συμμετρεω is the deliberate act of making objects commensurable, forming the basis of geometry. Gielis transformations operate on a function $f(\theta)$ (Equation 1) and associated curves, surfaces and (sub-) manifolds[1,9]. They provide a unique and uniform way of describing a wide variety of shapes[1] as diverse as plant cells, stems and flowers, starfish, crystals and galaxies. These all become commensurable, as a one-step transformation of conic sections.

$$\rho(\vartheta; f(\vartheta), A, B, m, n_1, n_2, n_3) = \quad \text{Equation 1}$$

-continued
$$f(\vartheta) \cdot \left[ \left| \frac{1}{A} \cdot \cos\frac{m\vartheta}{4} \right|^{n_2} + \left| \frac{1}{B} \cdot \sin\frac{m\vartheta}{4} \right|^{n_3} \right]^{-1/n_1}$$

$(m, n_2, n_3, \in \mathbb{R}; n_1, A, B, \in \mathbb{R}_0)$

The notion of Universal Natural Shapes is motivated by the fact that the deformations performed on the equations of Lamé curves[15] (Eqs. 2-6), superellipses or superellipsoids by Gielis transformations to arrive at Gielis curves ($\rho(\vartheta)\cos\vartheta$, $\rho(\vartheta)\sin\vartheta$) or surfaces (supershapes) ($\rho_1(\vartheta)\cos\vartheta\,\rho_2(\phi)\cos\phi$, $\rho_1(\vartheta)\sin\vartheta\,\rho_2(\phi)\cos\phi$, $\rho_2(\phi)\sin\phi$) are basically the same as the deformations of the Minkowskian theorem of Pythagoras. They lead to the metrics of physically relevant Friedman-Lemaître-Robertson-Walker (FLRW) space-time models[9,10]. In developing a geometrization of nature, the study of tangents, tangent spaces, and curvatures, based on superellipses and supershapes as length indicatrices, could unveil the geometrical meaning of all curvatures in Minkowski[16] and Riemann-Finsler[17] geometry, and the various natural processes that are modelled in this way[9,18]. Berger[19] remarked that: "Present models of geometry, even if quite numerous, are not able to answer various essential questions. For example: among all possible configurations of a living organism, describe its trajectory (life) in time". The development of such geometries; with anisotropy motivated from within geometry[20], essentially amounts to the foundation of a "geometrical theory of natural shapes and their development, irrespective of the nature of the forces that create them."[9,21]

The description of the natural principles that to a large extent determine the shapes observed in nature, from proteins to the relativistic universe itself, will be done in terms of the intrinsic and extrinsic curvatures of the "physical submanifolds" involved[10], and the inevitable inequalities between intrinsic and extrinsic curvatures. Such geometrically natural curvature conditions concern in their simplest form the constancy of curvatures like the extrinsic curvature, expressed by the mean curvature H (expressing uniform surface tension) or the intrinsic curvatures, expressed by Gauss curvature K for surfaces M in Euclidean 3D-space; they thus are examples of realizations of basic symmetries or classical variational optima[9]. The Euler inequality $K \leq H^2$ is the classic relation between (the square of) geometric and arithmetic means of the two principal curvatures.

As a matter of fact, Lamé curves include all four conic sections[22] (Eqs. 3-6). Superellipses (Eq. 2) are generalizations of circles and ellipses, and power functions, power laws[23,24] simply are generalizations of parabola and hyperbola. Superellipses and supercircles (for A=B in Eq. 2) use addition (related to the arithmetic mean) of variables raised to a fixed power ($x^n$ and $y^m$), while power laws use multiplication ($x^n y^m$=constant or $x=y^{m/n}$). Nature can thus be studied based on inequalities between geometric and arithmetic means of pure numbers, as an extension of the theory of application of areas and conic sections.

$$\left|\frac{x}{A}\right|^n + \left|\frac{y}{B}\right|^n = 1, \quad \text{Equations 2-6}$$

$$\frac{x}{A} + \frac{y}{B} = 1,$$

$$\frac{A}{x} + \frac{B}{y} = 1,$$

$$\left(\frac{x}{A}\right)^2 + \left(\frac{y}{B}\right)^2 = 1,$$

$$\sqrt{\frac{x}{A}} + \sqrt{\frac{y}{B}} = 1$$

Lamé and Gielis' curves and (hyper-) surfaces introduce "mild" anisotropies and have been called the "most natural curves and surfaces of Euclidean geometry"[25]. From a true geometrical perspective, a wide range of shapes in the natural sciences can all be produced in this rather universal way: 1) impose some "Euclidean" geometrical principles, and 2) apply some Gielis transformation $\rho(\theta)$ to the shapes resulting from these geometrical principles[25]. This gives a precise geometrical meaning of how shapes develop and grow and how they are embedded in the surrounding space. Two well-known examples, circle and spiral, can be characterised by the geometrical principle of dealing with stress. In studying natural shapes and, their development there are two opposite ways of dealing with stress, which is induced onto a shape by the surrounding space[10]. The first strategy is to go with the flow. Here the position and the curvature vectors are parallel and the circle is the associated shape. The second strategy is to completely oppose the tension with the two vectors perpendicular and then the logarithmic spiral is the associated shape (which is related to gnomonic growth). Applying a Gielis transformation to circle and spiral results in $(\rho(\vartheta)\cos\vartheta$ $\rho(\vartheta)\sin\vartheta)$ with $f(\vartheta)$=const. and $f(\vartheta)$=$e^{k\theta}$ (k=constant) respectively. Nature provides us with boundless examples of how from so simple a beginning endless, most beautiful and wonderful shapes and forms have and are being evolved.

3. Constant Anisotropic Mean Curvatures Surfaces are Equilibrium Shapes for Non-Equilibrium Conditions:

The rotational surfaces of Delaunay of constant mean curvature H, (planes and catenoïds for H=0, spheres and circular cylinders and unduloids and nodoids for H≠0) are other realizations of variational optima, serving as "equilibrium shapes" for a wide variety of marine organisms[26]. These shapes are intimately connected to the Plateau problem, soap bubbles and minimal surfaces[27], minimizing surface tension at all times, as efficiently as possible.

Recently, constant anisotropic mean curvature (CAMC) surfaces, the anisotropic analogues of catenoids and Delaunay surfaces[28] were studied using Gielis surfaces[11], defined as the spherical product of two planar Gielis curves, as examples of Wulff shapes. A Wulff shape is the "sphere" for an anisotropic energy in the sense that it is the minimizer of the energy for a fixed volume[11]. The supercatenoid has the property that sufficiently small pieces of it minimize the anisotropic energy defined by the Wulff shape among all surfaces having the same boundary. Sufficiently small pieces of the unduloid and nodoid minimize the anisotropic energy among all surfaces having the same boundary and enclosing the same three-dimensional volume. From a physical point of view supercatenoids are minimal surfaces, taking into account some underlying, for example, molecular symmetry. Hexagonal supercatenoids can be observed in prism, column or capped column-like shapes of snowflakes[29]. Like catenoids in soap films minimize stress completely for isotropic energies, in supercatenoids stress is also minimized locally, defined by the anisotropic energy. Supercatenoids then provide equilibrium shapes for snowflakes and their development. D'Arcy Thompson's original equation for non-spherical shapes already generalized surfaces with constant H. He used weighted arithmetic means between the two principal curvatures $\kappa_1$ and $\kappa_2$, with the orthogonal tensions $T_{1,2}$ on the surface as weight factors[26,29]. The same anisotropic growth has recently been demonstrated in plants[30,31,32].

Figure 2:
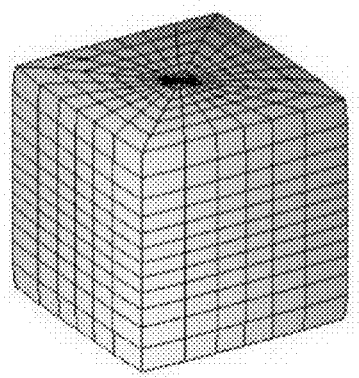
FIG. 2 shows an illustrative supercatenoid (right) minimizing the anisotropic energy defined by a cube with (m, $n_1$, $n_2$, $n_3$, M, $M_1$, $M_2$, $M_3$)=(4; 40; 40; 40; 4; 40; 40; 40) among all surfaces having the same boundary.
Figure 2:
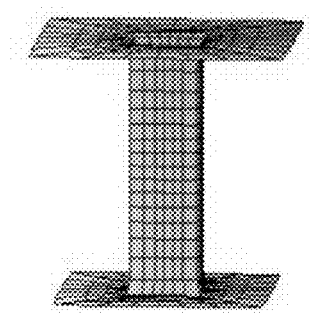

For reference, FIG. 2 shows an illustrative supercatenoid (right) minimizing the anisotropic energy defined by a cube with (m, $n_1$, $n_2$, $n_3$, M, $M_1$, $M_2$, $M_3$)=(4; 40; 40; 40; 4; 40; 40; 40) among all surfaces having the same boundary[11] (see text of the above reference 11).

4. Generalized Fourier Series for a Direct Description of Shape:

Gielis curves and surfaces nowadays allow for a uniform description of natural shapes (and not only their trajectories as in the 17$^{th}$ century) in an extremely compact way. This has hitherto been an intractable problem without resorting to infinite series. In this respect, it is useful to consider two distinct lines of development in science. The most important line focuses on isotropy, using lines and circles as basic curves to describe shapes, with Euclid, Archimedes, Ptolomy, Newton and Fourier as most well-known representatives. The second line focuses on a unique, direct description, whereby a wide range of shapes conforms to a uniform description. This is remarkably often linked to conic sections. With this line of direct description names as Apollonius, Kepler, Galilei, Lamé and Minkowski are associated. Gielis transformations linking natural shapes to conic sections belong to this line as well. Progress in our understanding of Nature then results from generalizing such uniform and unifying description, like describing projectile trajectories and planet orbits as conic sections by Galilei and Kepler respectively, into the laws of gravitation based on a computational method with circles. Newton's main step was indeed the determination of the curvature of any planar curve using circles, the pinnacle of the Oresme-Kepler-Huygens-Newton tradition.

This ongoing dialectic process of indirect versus direct representation is the finite versus infinite debate. An example is found in Fourier series, widely used in science and technology for the description of closed contours and waveforms, versus Chen's finite type curves[33]. In submanifold theory, k-type submanifolds include important classes like minimal submanifolds. In a plane, from a purely geometrical point of view, there is one and only one closed curve that can be expressed in a finite Fourier series, and that is the circle itself[33,34]. The circle is the only closed planar curve that is of finite type, namely 1-type (1T), but any other curve necessarily has a Fourier expansion of infinite type (∞T). Fourier series are based on isotropy with the Euclidean circle and its associated trigonometric functions and an alternative interpretation is that all curves other than the circle, including the ellipses, are equally complex: once their Fourier expansion starts, it never stops.

Figure 3:
FIG. 3 is a diagram showing four shapes (A), (B), (C), (D) that help to demonstrate that the information content of all supershapes, also of highly complex shapes, resembling (very) strange attractors, can be stored in a single equation and a few numbers only.

When Lamé-Gielis curves are used as unit circles in a generalized Fourier series, i.e., on any term of a classical Fourier series a Gielis transformation can act, any Gielis curve is encoded directly in one term. Their expansion, once it starts, stops immediately. All Gielis curves, including the circle, are equally simple. This corresponds to the fact that they are encoded in one equation, and differ from the circle only in a few parameters. In a similar way this can be extended to spherical harmonics, since surfaces (such as, by way of example, starfish, pyramids, cones and flowers and the highly complex shapes of FIG. 3) differ from a sphere only in a few parameters. This can further be used as a starting point for building curves and surfaces of k-type with k integer, leading to the very idea of a canonical spectral decomposition in terms of their own coordinate systems. From the point of view of encoding information the complexity of a collection of shapes is drastically reduced. FIG. 3 demonstrates that the information content of all supershapes, also of highly complex shapes, resembling (very) strange attractors, can be stored in a single equation and with only a few numbers.

5. Unique Rational Science:

For the study of physical submanifolds it is noted that, from a geometrical point of view, the Laplacian is directly related to the mean curvature H, which is a measure for the surface tension a shape receives from a surrounding space[38]. For surfaces $M^2$ in $E^3$ the mean curvature H appears in the formula of Beltrami $\Delta \vec{v} = -2\vec{H}$ where $\vec{v}$ is the position vector field of $M^2$ in $E^3$, $\Delta$ is the Laplace operator of $M^2$ and $\vec{H}$ is the mean curvature vector field of $M^2$ in $E^3$. Essentially, in k-type theory the Fourier expansion of a curve with respect to arc length is nothing but the spectral decomposition of the curve with respect to its Laplacian[33]. Beyond the descriptive aspect of a wide unification of abstract and natural shapes, the current paper thus combines algebra, analysis and geometry, the former two providing the foundations of mathematics and the latter its core[39].

This method combines the ideas and insights from the first two decades of the 19$^{th}$ century of Gabriel Lamé (1795-1870) and Joseph Fourier (1768-1830), both professors at the Ecole Polytechnique in Paris. In 1817 Gabriel Lamé published his remarkable book[15] proposing superellipses (Eq. 2 with A=B and n=1) as a model for crystallography. In his later works in mathematical physics Lamé envisaged that, from a mathematical point of view, to study a physical system amounts to the study of curvilinear coordinates, representing the given physical situation. Hence, the mathematical world of curvilinear coordinates may be regarded as a model of the world of physical systems[4]. To study the physical problem, adapted with a suitable system of curvilinear coordinates, only one equation needs to be solved: the Poisson equation in curvilinear coordinates, with appropriate boundary conditions; other equations and laws are reduced to special cases[4]. This solution can now be obtained using Fourier methods. Moreover, Gielis curves and surfaces carry natural curvilinear coordinate systems adapted to the system under study, reminiscent of Lamé's Unique Rational Science (or mathematical physics). This Science Rationelle Unique, the Universal Natural Shapes and a geometrical theory of morphogenesis all resonate along the same lines of providing a geometrical picture of the world.

In a geometric way a generalized Pythagorean theorem, expressing a conservation law among volumes of n-cubes, makes natural shapes, objects and phenomena commensurable (i.e. symmetric). The introduction of coordinates adapted to the shapes provides both description and understanding of shapes, the great, the small and most in between, while the power laws provide the framework in which they can grow and develop. Moreover, the same method that Lamé applied, however, namely exponent moderation in algebraic equations, can be used to generalize probability distributions. Gielis transformations have become fully embedded in geometry and science in general, resonating well with Einstein's remark[40]: "Our experience up to date justifies us in feeling sure that in Nature is actualized the ideal of mathematical simplicity."

6. Computational Methods:

Returning from the notion of a uniform, direct description to the idea of computational methods based on isotropy, Gielis transformations have opened the door for the extension of the Fourier method for the solution of boundary value problems. Since almost all two and three-dimensional normal-polar domains are described (or at least approximated as closely as needed) by Gielis curves and surfaces, techniques were developed with stretched polar coordinates for solving partial differential equations involving the Laplacian (including heat, wave, Laplace-, Poisson-, and Helmholtz equations) with boundary conditions of Dirichlet, Neumann or Robin type using a semi-Fourier method[12,13,14,35,36].

Figure 4:
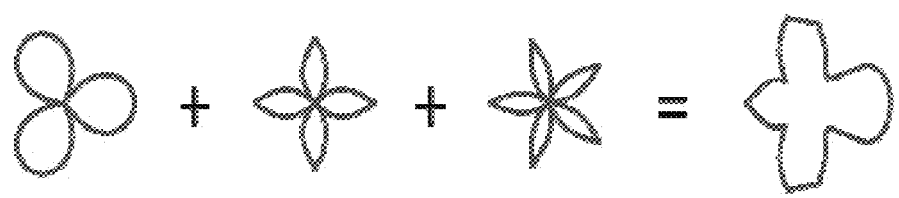
FIG. 4 is a diagram showing an illustrative k-type Gielis curve with k=3.

As an extension of this method for single and simple shapes, we present the analytical solution of the interior and exterior Dirichlet problems for the Laplace equation in Gielis domains of k-type, as examples of shapes specific to this present application (i.e., which extends beyond that described in the above-noted '527 patent). The 3-type Gielis curve shown in FIG. 4 is a sum of three terms and each of the terms is a rose or Grandi curve[26], inscribed in a Gielis curve[1]. In rose curves the number of lobes is dependent on whether the number is odd or even. The use of absolute values avoids this and the number of lobes is 2m, hence m/2 is used instead of m/4 in Equation 1. The first term is a three-lobed flower in an isotropic space, since exponents $n_i=2$ yields a Euclidean circle. The second and third term are a four and five lobed flower inscribed in a square and pentagon, respectively, with exponents n=1.

With reference to FIG. 4, the figure shows an illustrative k-type Gielis curve with k=3 for $$\rho_1\left(\vartheta; \left|\cos\frac{3}{2}\vartheta\right|, 1, 1, 3, 2, 2, 2\right) + $$
$$\rho_2(\vartheta; |\cos 2\vartheta|, 1, 1, 4, 1, 1, 1) + \rho_3\left(\vartheta; \left|\sin\frac{5}{2}\vartheta\right|, 1, 1, 5, 1, 1, 1\right)$$

Figure 5A:
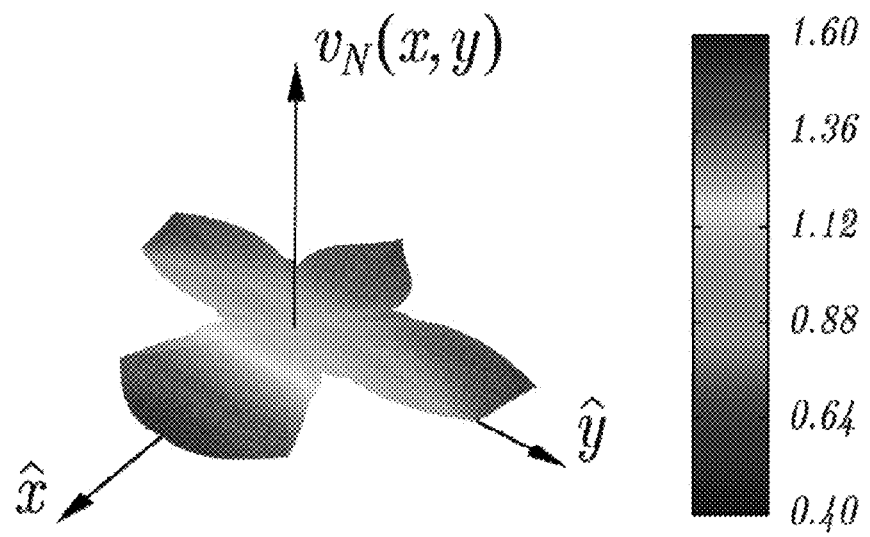
FIG. 5(A) shows a spatial distribution of the partial sum $U_N$ of order N=7 representing the solution of the Dirichlet problem for the Laplace equation for the domain described in FIG. 4 and with $f(x,y)$ =x+cos y describing the boundary data.
Figure 5B:
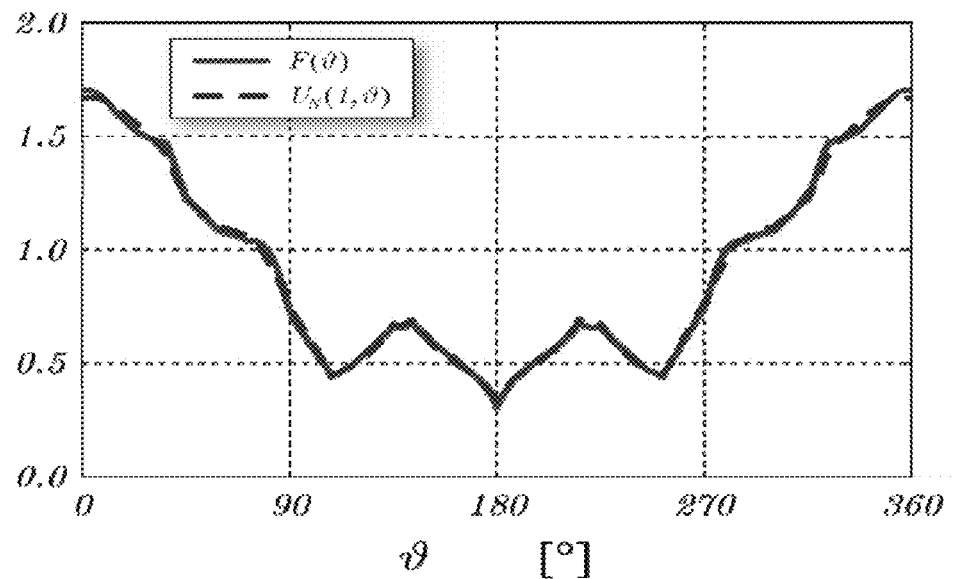
FIG. 5(B) shows an angular behaviour of the partial sum $U_N(1, \phi)$ with expansion order N=7.
Figure 5C:
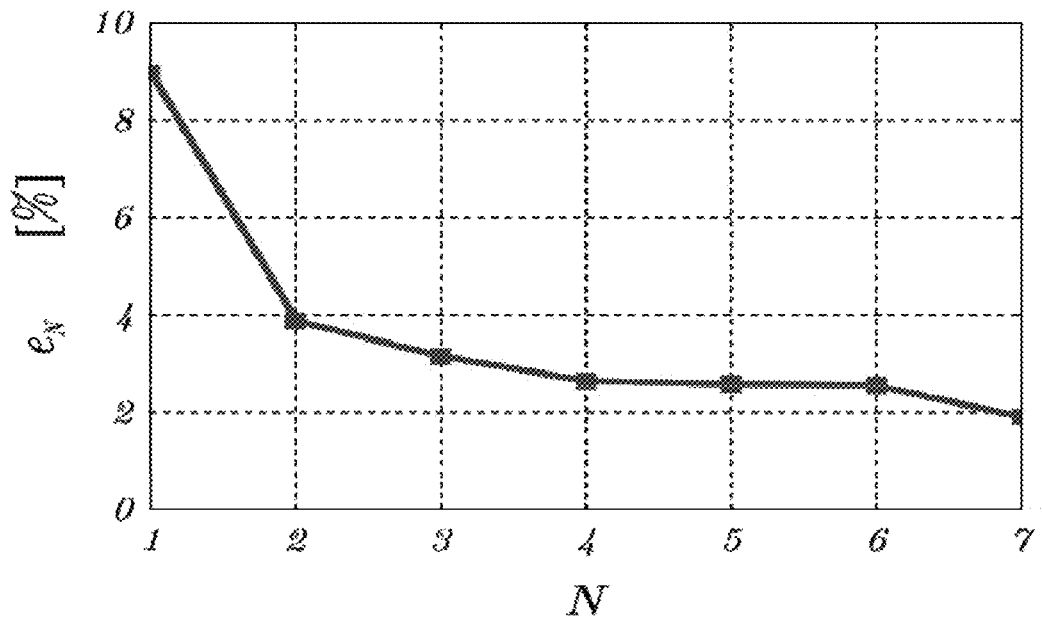
FIG. 5(C) shows a relative boundary error $e_N$ for N=7.

Here, we solve the Dirichlet problem for the Laplace equation using a semi-Fourier technique (FIG. 5(A)-(C)). The full exposition of the technique of the Laplacian in stretched polar coordinates, theorems and proofs can be found in Section 8 below "Supplementary Material for Universal Natural Shapes . . . ". To assess the performance of the technique in terms of accuracy and convergence rate, the relative boundary error is evaluated using Equation 7 with $\|\cdot\|$ denoting the usual $L^2$ norm, $U_N$ the partial sum of order N relevant to the Fourier-like series expansion representing the solutions of the Dirichlet problem for the Laplace equation, and F the function describing the boundary values.

$$e_N = \frac{\|U_N(1, \varphi) - F(\varphi)\|}{\|F(\varphi)\|} \qquad \text{Equation 7}$$

In this way, highly accurate approximations of the solution, featuring properties similar to the classical ones, are obtained. The $L^2$ norm of the difference between the exact solution and its approximate values is generally small. The point-wise convergence property of the solution seems to be in good agreement with the theoretical findings on series expansions by Lennart Carleson, with only exception of a set of measure zero formed by cusped and quasi-cusped singularities of the boundary.

With reference to FIGS. 5(A)-5(C), FIG. 5(A) shows a spatial distribution of the partial sum $U_N$ of order N=7 representing the solution of the Dirichlet problem for the Laplace equation for the domain described in FIG. 4 and with $f(x,y)$ =x+cos y describing the boundary data, FIG. 5(B) shows an angular behaviour of the partial sum $U_N(1, \phi)$ with expansion order N=7, and FIG. 5(C) shows a relative boundary error $e_N$ for N=7.

One general and coherent method, giving closed form solutions for any such domains, thus substitutes for a variety of methods (such as Green's functions approximation by least squares techniques, conformal mapping or solution of the boundary integral equation by iterative methods) avoiding the cumbersome computational methods of finite differences and finite elements. Closed form solutions of a wide range of classical differential problems, in planes and solids are possible, also for multi-valued functions as in Riemann surfaces[12] or self-intersecting (rational) Gielis curves[37]. The method can readily be extended to shapes described with Fourier descriptors, a method widely used to describe very complex shapes in biology.

Figure 6:
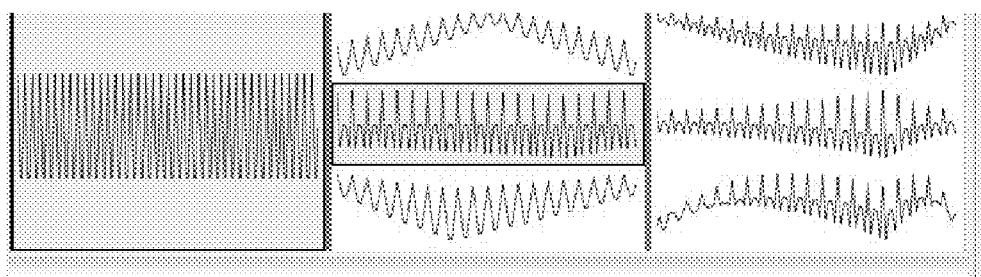
FIG. 6 is a diagram showing illustrative signals depicting superwaves with sharp discontinuities.

7. Building a Computational Toolbox:

While with the new computational methods above one observes a fast convergence towards the solution (for N=7), there still were the classical disadvantages of classical Fourier analysis, most notably the Gibbs phenomenon if accuracy needs to be increased. This can be avoided by using the coordinate functions directly into the Generalized Fourier analysis, rather than in the description only. The illustrative signals in FIG. 6 (which depicts superwaves with sharp discontinuities) for example are described by Equation 1 in one single step (k=1) and the sharp discontinuities are embedded in the shape description directly. By using only one or a limited number of terms (k typically small) Gibbs phenomena are avoided.

This allows the introduction of differentiability and curvature in continuous but not smooth curves, based on convex or concave shapes, other than the circle. In a more general way, it allows the study of manifolds with boundaries with corners or conical singularities, both on the manifold itself and in its tangent spaces, thereby bridging the discrete and the continuous. This method can also be applied to composite shapes with sharp corners. Up till now such shapes could not be considered to be manifolds. It should be appreciated that this approach extends to partial differential equations of lower, higher or of mixed order, to spherical harmonics and other transforms (including, e.g., wavelets), to $L^p$ instead of $L^2$ and so on.

Among other things, the embodiments herein can be applied to a variety of applications and implementations, including, amongst other applications, solid-state physics, fluid dynamics, electromagnetism, telecommunications, quantum theory, signal analysis, chemistry, biology, economics and finance. Advantageously, this new and very general method allows the construction of a "computer toolbox"— e.g., a programmed computer that is configured to run software configured to carry out methods of the present invention such as to, e.g., describe and/or compute in a straightforward way, shapes and/or their evolution, in the broadest sense.

According to some embodiments, a system and/or method is provided that involves the programming of a computer or other processing device with a software, hardware and/or firmware configured to create a processing tool (i.e., referred to herein as a tool box) that can be configured to provide one or more operational function based on new mathematical principles described herein for the purposes of, e.g., synthesizing and/or analyzing shapes and the like.

Figure 7:
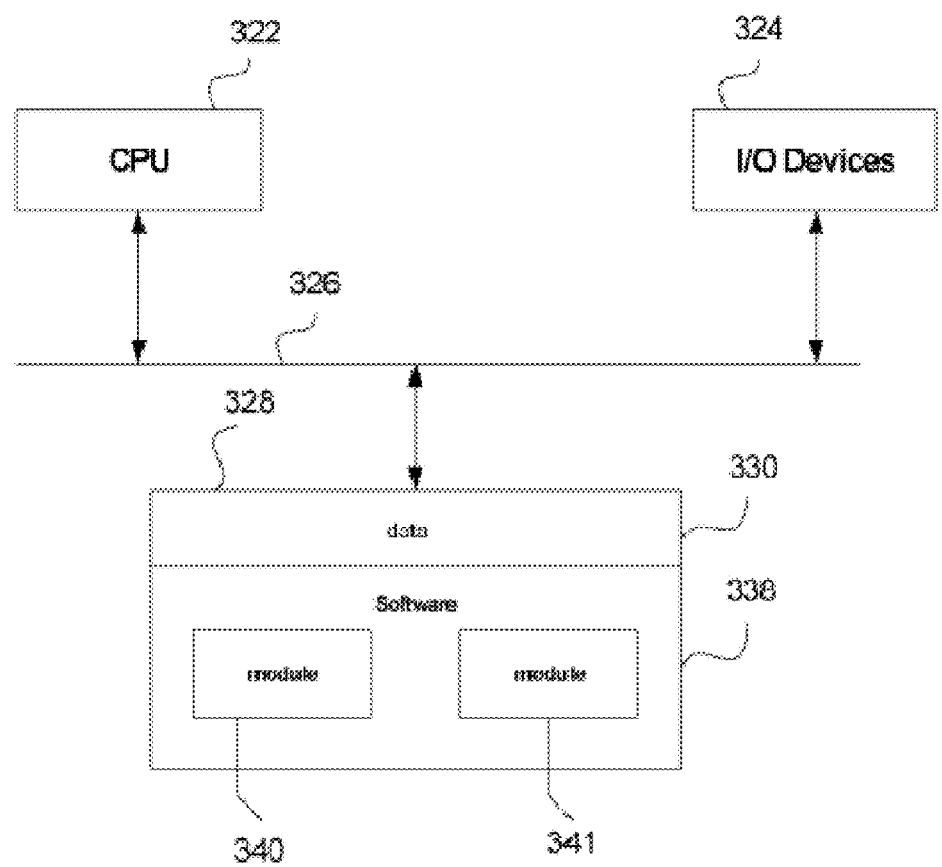
FIG. 7 is a schematic diagram showing components within an illustrative computer that can be used to implement embodiments of the invention.

In preferred embodiments, such a "tool box" can be implemented via a computer, such as, e.g., employing a computer programmed to perform processes set forth herein. By way of example, in some embodiments, a computer can include features as set forth below and as shown in FIG. 7. In particular, as shown in the figure below, an illustrative computer or control unit that can be used to implement computerized process steps, to be carried out by devices, such as, e.g., a computer (e.g., a desk top computer, a lap top computer, a personal digital assistance, a server computer and/or any other now or future now computational device). In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

8. Supplementary Material for Universal Natural Shapes: the Dirichlet Problem for the Laplace Equation in Gielis Domains:

The interior and exterior Dirichlet problems for the Laplace equation in Gielis domains are analytically addressed by using a suitable Fourier-like technique [see, e.g., Ref. 1 below]. A dedicated numerical procedure based on the computer algebra system Mathematica© is developed in order to validate the proposed approach. In this way, highly accurate approximations of the solution, featuring properties similar to the classical ones, are obtained. Computed results are found to be in good agreement with theoretical findings on Fourier series expansion presented by L. Carleson [see, e.g., Ref. 3 below].

a. The Laplacian in Stretched Polar Co-ordinates

Let us consider in the x, y plane the usual polar co-ordinate system $$x=\rho \cos \vartheta, y=\rho \sin \vartheta, \quad (1.1)$$

and the polar equation of $\partial D$ $$\rho=R(\vartheta)(0\leq \vartheta \leq 2\pi), \quad (1.2)$$

where $R(\vartheta)$ is a C2 function in $[0, 2\pi]$. We suppose that the domain D satisfies $$0\leq \rho \leq R(\vartheta), \quad (1.3)$$

and therefore $mR=\min_{\vartheta \in [0,2\pi]} R(\vartheta) > 0$. In addition, let us assume $MR=\max_{\vartheta \in [0,2\pi]} < 1$.

We introduce the stretched radius $\sigma^*$ (also shown below as q*) such that $$\rho=\sigma^* R(\vartheta), \quad (1.4)$$

and the following curvilinear co-ordinates $\sigma^*, \vartheta$ in the x, y plane $$x=\sigma^*R(\vartheta)\cos\vartheta, y=\sigma^*R(\vartheta)\sin\vartheta \quad (1.5)$$

Therefore, D is described by the inequalities $0 \le \vartheta \le 2\pi$, $0 \le \sigma^* \le 1$.

We consider a $C^2(D)$ function $v(x,y) = v(\rho\cos\vartheta, \rho\sin\vartheta) = u(\rho,\vartheta)$ and the Laplace operator in polar co-ordinates $$\Delta u = \frac{\partial^2 u}{\partial \rho^2} + \frac{1}{\rho}\frac{\partial u}{\partial \rho} + \frac{1}{\rho^2}\frac{\partial^2 u}{\partial \vartheta^2}. \quad (1.6)$$

Let us represent this operator in the new stretched co-ordinate system $\sigma^*, \vartheta$. Upon setting $$U(\sigma^*, \vartheta) = u(\sigma^* R(\vartheta), \vartheta), \quad (1.7)$$

we readily find $$\frac{\partial u}{\partial \rho} = \frac{1}{R}\frac{\partial U}{\partial \varrho^*}, \quad (1.8)$$

$$\frac{\partial^2 u}{\partial \rho^2} = \frac{1}{R^2}\frac{\partial^2 U}{\partial \varrho^{*2}}, \quad (1.9)$$

$$\frac{\partial u}{\partial \vartheta} = -\varrho^* \frac{R'}{R}\frac{\partial U}{\partial \varrho^*} + \frac{\partial U}{\partial \vartheta}, \quad (1.10)$$

$$\frac{\partial^2 u}{\partial \vartheta^2} = \varrho^* \frac{2R'^2 - RR''}{R^2}\frac{\partial U}{\partial \varrho^*} + \varrho^{*2}\frac{R'^2}{R^2}\frac{\partial^2 U}{\partial \varrho^{*2}} - 2\varrho^* \frac{R'}{R}\frac{\partial^2 U}{\partial \varrho^* \partial \vartheta} + \frac{\partial^2 U}{\partial \vartheta^2}. \quad (1.11)$$

Hence, substituting equations (1.8)-(1.11) into equation (1.6) we obtain $$\Delta u = \frac{\partial^2 u}{\partial \rho^2} + \frac{1}{\rho}\frac{\partial u}{\partial \rho} + \frac{1}{\rho^2}\frac{\partial^2 u}{\partial \vartheta^2} = \quad (1.12)$$

$$\frac{1}{R^2}\left(1 + \frac{R'^2}{R^2}\right)\frac{\partial^2 U}{\partial \varrho^{*2}} + \frac{1}{\varrho^* R^2}\left(1 + \frac{2R'^2 - RR''}{R^2}\right)\frac{\partial U}{\partial \varrho^*} - \frac{2R'}{\varrho^* R^3}\frac{\partial^2 U}{\partial \varrho^* \partial \vartheta} + \frac{1}{\varrho^{*2} R^2}\frac{\partial^2 U}{\partial \vartheta^2}.$$

For $\sigma^* = \rho$, $R(\vartheta) \equiv 1$, we recover the Laplacian in usual polar co-ordinates.

b. The Dirichlet Problem for the Laplace Equation

Let us consider the interior Dirichlet problem for the Laplace equation in a starlike domain D, whose boundary is described by the polar equation $\rho = R(\vartheta)$, $$\begin{cases} \Delta u(x,y) = 0, & (x,y) \in \overset{\circ}{\mathcal{D}}, \\ u(x,y) = f(x,y), & (x,y) \in \partial\mathcal{D}. \end{cases} \quad (2.1)$$

We prove the following theorem.

Theorem 2.1—Let $$f(R(\vartheta)\cos\vartheta, R(\vartheta)\sin\vartheta) = F(\vartheta) = \quad (2.2)$$

$$= \sum_{m=0}^{+\infty}(\alpha_m \cos m\vartheta + \beta_m \sin m\vartheta),$$

where

-continued $$\begin{Bmatrix} \alpha_m \\ \beta_m \end{Bmatrix} = \frac{\epsilon_m}{2\pi}\int_0^{2\pi} F(\vartheta)\begin{Bmatrix} \cos m\vartheta \\ \sin m\vartheta \end{Bmatrix} d\vartheta, \quad (2.3)$$

$$\epsilon_m = \begin{cases} 1, & m = 0 \\ 2, & m \ne 0 \end{cases}$$

being the Neumann's symbol. Then, the interior boundary-value problem for the Laplace equation (2.1) admits a classical solution $$v(x,y) \in C^2(\mathcal{D}) \quad (2.4)$$

such that the following Fourier-like series expansion holds $$u(\varrho^* R(\vartheta)\cos\vartheta, \varrho^* R(\vartheta)\sin\vartheta) = U(\varrho^*, \vartheta) \quad (2.5)$$

$$= \sum_{m=0}^{+\infty}[\varrho^* R(\vartheta)]^m (A_m \cos m\vartheta + B_m \sin m\vartheta).$$

The coefficients $A_m$, $B_m$ in (2.5) can be determined by solving the infinite linear system $$\sum_{m=0}^{+\infty}\begin{bmatrix} X_{n,m}^+ & Y_{n,m}^+ \\ X_{n,m}^- & Y_{n,m}^- \end{bmatrix} \cdot \begin{bmatrix} A_m \\ B_m \end{bmatrix} = \begin{bmatrix} \alpha_n \\ \beta_n \end{bmatrix}, \quad (2.6)$$

where $$X_{n,m}^\pm = \frac{\epsilon_n}{2\pi}\int_0^{2\pi} R(\vartheta)^m \cos m\vartheta \begin{Bmatrix} \cos n\vartheta \\ \sin n\vartheta \end{Bmatrix} d\vartheta, \quad (2.7)$$

$$Y_{n,m}^\pm = \frac{\epsilon_n}{2\pi}\int_0^{2\pi} R(\vartheta)^m \sin m\vartheta \begin{Bmatrix} \cos n\vartheta \\ \sin n\vartheta \end{Bmatrix} d\vartheta, \quad (2.8)$$

with $m, n \in \mathbb{N}_0$.

Proof—In the stretched co-ordinates system for the x, y plane the domain D is transformed into the unit circle; so, we can use the usual eigenfunction method [see, e.g., Ref. 2 below] and separation of variables (with respect to the variables $\rho$, $\vartheta$) to solve (2.1). As a consequence, elementary solutions of the problem can be searched in the form $$u(\rho, \vartheta) = U\left(\frac{\rho}{R(\vartheta)} \cdot \vartheta\right) = P(\rho)\Theta(\vartheta). \quad (2.9)$$

Substituting into the Laplace equation we easily find that the functions $P(\cdot)$, $\Theta(\cdot)$ must satisfy the ordinary differential equations $$\frac{d^2 \Theta(\vartheta)}{d\vartheta^2} + \mu^2 \Theta(\vartheta) = 0, \quad (2.10)$$

$$\rho^2 \frac{d^2 P(\rho)}{d\rho^2} + \rho\frac{dP(\rho)}{d\rho} - \mu^2 P(\rho) = 0, \quad (2.11)$$

respectively.

The parameter μ is a separation constant whose choice is governed by the phisical requirement that at any fixed point in the plane the scalar field u (ρ, $\vartheta$) must be single-valued. So, by setting $$\mu = m \in N_0, \quad (2.12)$$

we find $$\Theta(\vartheta) = a_m \cos m\vartheta + b_m \sin m\vartheta \quad (2.13)$$

where $a_m$, $b_m \in R$ denote arbitrary constants. The radial function P (·) satisfying (2.11) can be readily expressed as follows $$P(\rho) = c_m \rho^m + d_m \rho^{-m}, (c_m, d_m \in R). \quad (2.14)$$

As usual, we have to assume $d_m = 0$ for the boundedness of the solution. Therefore, the general solution of the interior Dirichlet problem (2.1) can be searched in the form $$u(\rho, \vartheta) = \sum_{m=0}^{+\infty} \rho^m (A_m \cos m\vartheta + B_m \sin m\vartheta). \quad (2.15)$$

Finally, imposing the boundary condition $$F(\vartheta) = U(1, \vartheta) = u(R(\vartheta), \vartheta) = \sum_{m=0}^{+\infty} R(\vartheta)^m (A_m \cos m\vartheta + B_m \sin m\vartheta), \quad (2.16)$$

and using the Fourier's projection method, the equations (2.6)-(2.8) easily follow.

Remark 1—Let us consider the associated interior Dirichlet problem for the Laplace equation on the unit circle with boundary values F ($\vartheta$) given by (2.2). The solution of such problem is readily expressed as $$\overline{U}(\varrho^*, \vartheta) = \sum_{m=0}^{+\infty} (\varrho^*)^m (\alpha_m \cos m\vartheta + \beta_m \sin m\vartheta). \quad (2.17)$$

By virtue of the maximum principle, the assumption $0 < m_R \leq R(\vartheta) \leq M_R \leq 1$ implies that the solution of the problem (2.1) is dominated by (2.17). Therefore;

$$\left| \sum_{m=0}^{+\infty} R(\vartheta)^m (A_m \cos m\vartheta + B_m \sin m\vartheta) \right| \leq \left| \sum_{m=0}^{+\infty} (\alpha_m \cos m\vartheta + \beta_m \sin m\vartheta) \right|, \quad (2.18)$$

and using the linearity of the operator, we find $$|A_m| R(\vartheta)^m \leq |\alpha_m|, |B_m| R(\vartheta)^m \leq |\beta_m|, \quad (2.19)$$

with $m \in N_0$. By Lebesgue's theorem, the Fourier coefficients $\alpha_m$, $\beta_m$ go to zero when $m \to +\infty$ and the order of convergence to zero increases with the smoothness of boundary values F ($\vartheta$). According to inequalities (2.19), the coefficients $A_m$, $B_m$ are also infinitesimal, since R($\vartheta$) is bounded. This means that the vectorial operator defined by the system (2.6) is compact. In fact we can split up this operator in the sum of two parts, such that the former is finite-dimensional and the latter features maximum (or $L^2$) norm as small as we wish.

In a similar way, the exterior Dirichlet problem $$\begin{cases} \Delta v(x, y) = 0, & (x, y) \in \mathbb{R}^2 \setminus \mathcal{D}, \\ v(x, y) = f(x, y), & (x, y) \in \partial \mathcal{D}, \end{cases} \quad (2.20)$$

subject to the null condition at infinity $$\lim_{\rho \to +\infty} v(x, y) = 0, \quad (2.21)$$

may be addressed. In particular, the following theorem can be easily proved.

Theorem 2.2—Under the hypotheses of previous theorem, the exterior boundary-value problem for the Laplace equation (2.20)-(2.21) admits a classical solution $$v(x,y) \in C^2(\mathbb{R}^2 \setminus \overline{\mathcal{D}}) \quad (2.22)$$

such that the following Fourier-like series expansion holds $$u(\varrho^* R(\vartheta) \cos\vartheta, \varrho^* R(\vartheta) \sin\vartheta) = U(\varrho^*, \vartheta) = \quad (2.23)$$

$$= \sum_{m=1}^{+\infty} [\varrho^* R(\vartheta)]^{-m} (A_m \cos m\vartheta + B_m \sin m\vartheta).$$

The coefficients $A_m$, $B_m$ in (2.23) are the solution of the infinite linear system $$\sum_{m=0}^{+\infty} \begin{bmatrix} X_{n,m}^+ & Y_{n,m}^+ \\ X_{n,m}^- & Y_{n,m}^- \end{bmatrix} \cdot \begin{bmatrix} A_m \\ B_m \end{bmatrix} = \begin{bmatrix} \alpha_n \\ \beta_n \end{bmatrix}, \quad (2.24)$$

where $$X_{n,m}^\pm = \frac{\epsilon_n}{2\pi} \int_0^{2\pi} R(\vartheta)^{-m} \cos m\vartheta \begin{Bmatrix} \cos n\vartheta \\ \sin n\vartheta \end{Bmatrix} d\vartheta, \quad (2.25)$$

$$Y_{n,m}^\pm = \frac{\epsilon_n}{2\pi} \int_0^{2\pi} R(\vartheta)^{-m} \sin m\vartheta \begin{Bmatrix} \cos n\vartheta \\ \sin n\vartheta \end{Bmatrix} d\vartheta, \quad (2.26)$$

with $m, n \in \mathbb{N}$.

Remark 2—Note that the above formulas still holds under the assumption that the function R($\vartheta$) is a piecewise continuous function, and the boundary data are described by square integrable functions, not necessarily continuous, so that the relevant Fourier coefficients $\alpha_m$, $\beta_m$ in equation (2.3) are finite quantities.

c. Numerical Example

The developed methods can be readily applied to the solution of differential problems in a two-dimensional domain D whose boundary is described by the general k-type Gielis curve $$\rho = R(\vartheta) = \sum_{j=0}^{k} r_G(\vartheta; \gamma_j(\vartheta), a_j, b_j, m_j, n_{1j}, n_{2j}, n_{3j}), \quad (3.1)$$

where $$r_G(\vartheta; \gamma(\vartheta), a, b, m, n_1, n_2, n_3) = \quad (3.2)$$

$$\gamma(\vartheta) \left( \left| \frac{1}{a} \cos \frac{m\vartheta}{4} \right|^{n_2} + \left| \frac{1}{b} \sin \frac{m\vartheta}{4} \right|^{n_3} \right)^{-1/n_1}$$

denotes the ordinary Gielis polar equation modulated by a smooth function $\gamma(\vartheta)$. As an example, by using Theorem 2.1 the interior Dirichlet problem for the Laplace equation has been solved in the k-type Gielis domain of order k=3

$$\rho = R(\vartheta) = r_G\left(\vartheta; \left|\cos\frac{3\vartheta}{2}\right|, 1, 1, 3, 2, 2, 2\right) ++ \qquad (3.3)$$

$$r_G(\vartheta; |\cos 2\vartheta|, 1, 1, 4, 1, 1, 1) + r_G\left(\vartheta; \left|\sin\frac{5\vartheta}{2}\right|, 1, 1, 5, 1, 1, 1\right).$$

under the assumption that the boundary values are given by $f(x, y)=x+\cos y$.

d. References

The following further background references are incorporated herein by reference in their entireties.

[Ref. 1] P. Natalini, R. Patrizi, P. E. Ricci, The Dirichlet problem for the Laplace equation in a starlike domain of a Riemann surface. *Numer. Algor.*, 49 (2008), 299-313.

[Ref. 2] G. P. Tolstoy, *Fourier series*, Transl. from Russian by R. A. Silverman, Dover Publ. Inc., New York, 1962.

[Ref. 3] L. Carleson, On convergence and growth of partial sums of Fourier series. *Acta Math.*, 116 (1966), 135-157.

[Ref. 4] F. Riesz, *Les systèemes d'équations linéaires à une infinité d'inconnues*, Gauthier Villars, Paris, 1952.

9. Novel Modulated Gielis Formula

According to the preferred embodiments, the following new general equation is set forth having substantial advantageous applications and implementations within computer devices, such as, e.g., within a computer tool box as described herein.

$$\rho = R(\vartheta) = \sum_{j=0}^{k} r_G(\vartheta; \gamma_j(\vartheta), m_j, a_j, b_j, n_{1j}, n_{2j}, n_{3j}),$$

where $$r_G(\vartheta; \gamma(\vartheta), a, b, m, n_1, n_2, n_3) = \qquad \text{(Equation 1)}$$

$$\gamma(\vartheta) \cdot \left[\left|\frac{1}{a}\cdot\cos\frac{m}{4}\vartheta\right|^{n_2} + \left|\frac{1}{b}\cdot\sin\frac{m}{4}\vartheta\right|^{n_3}\right]^{-1/n_1}$$

In some instances, the parameters can include offset, meaning not having same center of gravity or translation, meaning situated elsewhere in the plane or in space.

For reference, this new equation was discussed in section 8 (equation 3.1.) and the lower equation was discussed above in Section 2 (i.e., equation 1) and in Section 8 (i.e., equation 3.2). This equation leads to substantial advantages over that described in the '527 patent discussed above. Moreover, the equation also has advantageous special cases including the generalized Fourier series and k-type curves as described herein.

Among other things, with this new equation, one can, e.g., describe any planar curve or surface with any desired level of accuracy.

This new equation provides a novel modulated-Gielis-formula that is modulated by a smooth function $\gamma(\vartheta)$.

Equation 1 is a partial sum, of the general form:

$$\rho = R(\vartheta) = \sum_{j=0}^{\infty} r_G(\vartheta; \gamma_j(\vartheta), m_j, a_j, b_j, n_{1j}, n_{2j}, n_{3j}) \qquad \text{(Equation 3)}$$

Very notably, this new modulated Gielis formula equation, allows for a very accurate description of any curve, with any desired accuracy.

The reason for this is that a Fourier series $$f(t) = a_0 + \sum_{n=1}^{\infty} a_n \cos n\omega t + \sum_{n=1}^{\infty} b_n \sin n\omega t \qquad \text{(Equation 4)}$$

is a special case of equation whereby trigonometric functions are used and whereby the classic Gielis part is equal to a constant, representing a circle or isotropic space with radius $a_n$ or $b_n$. In the general case, these constants are functions.

Pointwise convergence property of Fourier series has been shown by Lennart Carleson, with the exception of the set of zero measure formed by cusped and quasi-cusped singularities of the boundary. It is noted that cusps and quasi-cusps can be represented adequately by Gielis curves or Equation 1.

10. Illustrative Applications and Implementations:

a. Enhanced Synthesis Applications (e.g., Making of Images, Articles, Etc.)

This approach extends greatly the possibilities of constructing complicated shapes (such as, e.g., in the synthesis of assorted images, articles, etc., without altering the simplicity.

i. Linear Interpolation Between Terms.

The original Gielis formula (aka. the superformula described in the '527 patent) can be understood as a transformation, where a constraining function CF acts on developable functions $DF=f(\vartheta)$. These curves impose a constraining geometry in which the developable function DF (circle, spiral . . . ) can develop, in an anisotropic way with preferred directions and distances (for CF≠1). The coordinate functions of supercircles and superellipses are obtained when $f(\vartheta)$ are cosine or sine functions. At the same time, such functions are generalized trigonometric functions allowing to greatly broaden the scope of Grandi-flowers or rose-curves. When using Grandi-curves, the original equation is slightly modified with the factor m/2 because of the absolute values necessary for the Grandi-curve. These yield, e.g., flower shapes described in the '527 patent.

According to some preferred embodiments, in order to describe fusion in flowers, Equation 1 (i.e., the new modulated Gielis formula) can be used, with two terms only, one acting as developable and the other as constraining function. Fusion can be achieved using weighted addition of the two functions CF and DF, defined by a weight parameter α with 0≤α≤1:

$$\alpha \cdot DF + (1-\alpha) \cdot CF \qquad \text{(Equation 5)}$$

Figure 8:
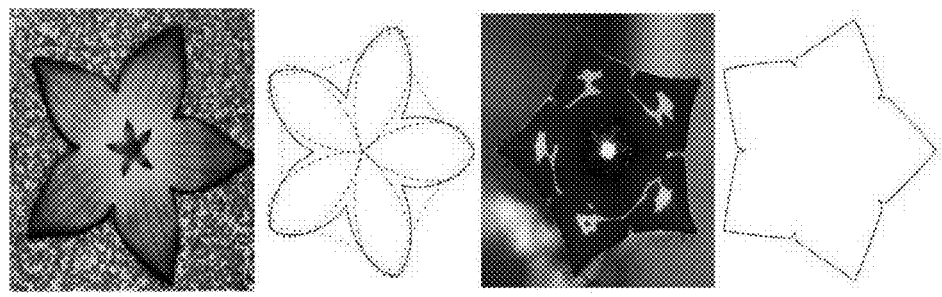
FIG. 8 is a diagram showing illustrative examples of flowers constructed according to some illustrative embodiments.

FIG. 8 shows an illustrative example in which Example of Huernia flower and Caralluma frerei (syn: Frerea indica, right) constructed with Equation 6 (below). With reference to FIG. 8, using weighted addition of DF and CF, the "influence" of the developable function DF (FIG. 8 left, shown in blue) or the constraining function CF (the superpolygon, shown at the right in green) can be adjusted. The parameters are selected as follows: a pentagon (m=5) with exponents n=1. Values for α can range from 0.5 to 1. The resulting flower is then: $r_{tot}=\alpha \cdot r_1 + (1-\alpha) r_2$ (in red). The variables are n and α. This is about pentameric flowers (with five petals), but this could also be changed in $r_1$ and $r_2$ into a variable m for symmetry).

$$r1(\phi) := \left[\left(\left|\cos\left(\frac{\phi \cdot 5}{4}\right)\right|\right)^n + \left(\left|\sin\left(\frac{\phi \cdot 5}{4}\right)\right|\right)^n\right]^{-\frac{1}{n}} \quad \text{(Equation 6)}$$

$$r2(\phi) := \left(\left|\cos\left(\frac{5 \cdot \phi}{2}\right)\right|\right)^{\frac{1}{1}}$$

$$rtot(\phi) := \alpha \cdot r1(\phi) + (1-\alpha) \cdot r2(\phi)$$

In this way, most of the flowers in nature can be readily described, either as a convolution or as a weighted sum, or as combinations thereof. In the table below, various illustrative possibilities are shown. The use of multiplication and/or weighted addition between DF and CF allows defining three simple strategies (S1-3) to describe variation in flowers, including polysymmetric and monosymmetric flowers (see FIG. 9). The first strategy (S1) operates either on CF or DF. The second and third strategies (S2) and S(3) use multiplications and addition, respectively, allowing for the description of choripetalous and sympetalous flowers. Notably, circumscribing polygons can also have low rotational symmetry, which introduces bilateral symmetry (see, e.g., the right example of S2 in FIG. 9).

The next logical steps are exploring combinations of strategies (see, e.g., FIG. 10). The constraining of the space—the action of CF onto DF—thereby introducing anisotropy, has many positive effects, for example the equidistant positioning and spacing of flower organs, in sepals, petals, stamen and in developing gynoecia in the "corners" of the superpolygons.

FIG. 9 is a chart illustrating three basic strategies in flowers, and FIG. 10 is a chart illustrating a combination of three basic strategies in flowers.

Among other things, this approach solves a problem, which could not be tackled in this manner with the original Gielis superformula of the '527 patent. Fusion is one of the most important drivers in the evolution of flowers. Furthermore, this can also be used to describe certain phenomena with waves, as this is another graphical expression of flowers.

It is the simplest example of the use of a series for two reasons. First, it only contains two or three terms, depending on the strategy. Second, it concerns a linear interpolation between two functions, or two terms in Equation 1. Between terms of Equation 1 a plurality of interpolations are possible, including derivatives and gradients.

While this section discusses an application related to flowers, it should be understood based on this disclosure that the present invention can apply to the description or analysis of any shape, waveform, etc.

ii. Curves of K-type.

Herein, shapes resulting from equation 1 are called k-type curves. When the functions $f(\vartheta)$ are trigonometric functions, a generalized Fourier series results, with an and bn functions rather than constants. In a generalized Fourier series, i.e., on any term of a classical Fourier series a Lamé-Gielis transformation can act, any Lamé-Gielis curve is encoded directly, in one term only. This is, of course, a direct consequence of the fact that they are encoded in one equation, and differ from the circle only in a few parameters. In a similar way, this can be extended to spherical harmonics, since surfaces (such as, e.g., by way of some illustrative examples, starfish, pyramids, cones and flowers or highly complex shapes) differ from a sphere only in a few parameters. This can further be used as a starting point for building curves and surfaces as sums. Partial sums are then called of finite k-type with k integer.

One illustrative example of 3-type with three terms is the shape reproduced in FIG. 4, discussed above. In that figure, the first term is a three-lobed flower in an isotropic space, since exponents $n_i=2$ yields a Euclidean circle. The second and third term are a four and five lobed flower inscribed in a square and pentagon, respectively, with exponents n=1. In the shape outline of a flying bird one can indeed observe the various symmetries. The selected parameters are indicated in the caption to the figure. Specifically, FIG. 4 shows an illustrative k-type Gielis curve with k=3 for $$\rho_1\left(\vartheta; \left|\cos\frac{3}{2}\vartheta\right|, 1, 1, 3, 2, 2, 2\right) +$$

$$\rho_2(\vartheta; |\cos 2\vartheta|, 1, 1, 4, 1, 1, 1) + \rho_3\left(\vartheta; \left|\sin\frac{5}{2}\vartheta\right|, 1, 1, 5, 1, 1, 1\right)$$

iii. Surfaces of K-type.

For three dimensions, the family of Gielis surfaces can be extended infinitely to include cross sections of any complexity and shape. The parametric representation of 3D superformula is based on two perpendicular cross sections $\rho_1(\vartheta)$ and $\rho_2(\vartheta)$:

$$\begin{bmatrix} x = \rho_1(\vartheta)\cos\vartheta \cdot \rho_2(\varphi)\cos\varphi \\ y = \rho_1(\vartheta)\sin\vartheta \cdot \rho_2(\varphi)\cos\varphi \\ z = \rho_2(\varphi)\sin\varphi \end{bmatrix} \quad \text{Equation 7}$$

where ρ is defined by equation 1 in its full generality. This can be extended further to n dimensions in various ways. The methods are the same as for 2D curves.

It should be understood that while examples here relate to representation curves in a plane or space, in function spaces each of the shapes is represented by a single point.

b. Enhanced Analysis Applications (e.g., Analysis of Images, Articles, Etc.):

i. The Problem.

Until now, Gielis curves & surfaces display certain symmetries and are relatively simple (although methods for analyzing self-intersecting shapes are novel). More complex shapes have been proposed using c-point technology (see, i.e., the present inventor, Johan Gielis' prior U.S. Patent Publication No. 2005/0140678A1, the entire disclosure of which is incorporated by reference herein), but that is an algorithmic solution. For scientific and technological applications there is a need for a direct representation.

ii. The Solution.

Typically, in curves and surfaces described above, supershapes are defined from 0 to 2π (or 2kπ in the case of Rational Gielis Curve (RGC)—with RGC, m is a rational number leading to self-intersecting curves). However, shapes can be defined by piecewise supershapes, similar to piecewise linear approximations (including triangulations) known in the art. Such piecewise approaches can be done through expansions, such as, e.g., Equations 1 and 2, thus including generalized Fourier or trigonometric series, or as c-point curves (such as, e.g., discussed above in U.S. Patent Publication No. 2005/0140678A1).

iii. Process and Steps.

In some illustrative embodiments, process steps, which can be implemented, e.g., with computer software, can involve the following.

A highly complex shape is converted into superformula parameters using equation 1. This can also be done in many ways. One example is the use of trigonometric functions and summations thereof, fashioned after the way of a Fourier series. In a generalized Fourier series, i.e., on any term of a classical Fourier series a Lamé-Gielis transformation can act, any Lamé-Gielis curve is encoded directly, in one term only. This is of course a direct consequence of the fact that they are encoded in one equation, and differ from the circle only in a few parameters. In a similar way, this can be extended to spherical harmonics, since surfaces (such as, e.g., starfish, pyramids, cones and flowers or highly complex shapes) differ from a sphere only in a few parameters. This can further be used as a starting point for building curves and surfaces as sums. Partial sums are then called of finite k-type with k integer.

In some embodiments, the software can also involve the use of a novel type of derivatives and derivation, based on supershapes themselves. Classical derivatives were expanded by Euler to include derivatives of order k for k rational (e.g., gamma function). These provide for interpolations of derivatives for non-integer order. In some embodiments of a computer toolbox, the notion of derivatives includes a generalization of the notion of derivation based on the Gielis Formula or supershapes. In this case, the curvature of a curve in a point p is not as in classical geometry, based upon a circle, but based on the supershape itself.

In the classical approach, which is a local operation, each point can be approximated by a circle whereby the radius of the osculating circle is the inverse of the curvature of a curve at that point and there is only one curve where this circle is also completely oscullating, and that is the circle itself. By approximating the curve with supershapes, the data from these approximations can be used as the unit circle associated to the curve (Lamé's idea of coordinates adapted to the shape) and the new curvature function is derived instantly. Anisotropic unit circles can have as many cusps or singularities as one might wish, an aspect that classical Fourier series cannot deal with properly. An analysis based on pure shape description incorporates such singularities a priori.

In the final step, this can be used to convert highly complex 2D and 3D shapes into a supershape dataset. Among other things, this can be used in a variety of analysis applications, such as, in some illustrative examples, for example in map making and medical imaging and/or other applications.

c. Enhanced Optimization Applications (e.g., Optimization of Shapes, Articles, Etc.):

1. Datamining

Datamining is a branch of computer science and artificial intelligence that involves the process of extracting patterns from data. Datamining is becoming an increasingly important tool to transform large amounts of data into a knowledge form giving an informational advantage. Datamining is also considered to be a step in a larger process known as knowledge discovery in databases (KDD).

i. Background and Rationale for Using Gielis Formula

In datamining, an unsolved problem is the definition of regions in higher dimensional spaces. It was shown by Kuri-Morales, et al. that supershapes could be used to unveil the existence of anisotropic regions in higher dimensional space, using Gielis Formula and determining its parameters by using evolutionary algorithms. In current technology, one uses isotropy as the underlying assumption. As a corollary, if one assumes the existence of anisotropic regions in higher dimensional spaces, current methods lack proper theoretical foundations. Unfortunately, as an example of the curse of dimensions, the computational times needed to go from experiments carried out in 3D into multidimensions, is prohibitive.

ii. Kuri-Morales Reference

Reference is now made to Kuri-Morales A. and Aldana-Bobadilla E. (2011), The Search for Irregularly Shaped Clusters in Data Mining at Chapter 17 of New Fundamental Technologies in Data Mining Edited by Kimito Funatsu and Kiyoshi Hasegawa, InTech Open Access, Rijeka, Croatia, pp. 223-254.

One of the major goals of data mining is the unsupervised process of determining which objects in the database share interesting properties. This process is also known under the name of knowledge discovery. Such new knowledge may lead to new processes or products whereby companies can address new needs and customer groups. Worldwide this in one of the companies and organizations accumulate a growing number of data, stored on computer databases or data warehouses. These data can be related to products, processes, marketing and sales, but also meta data. Datamining or knowledge discovery aims to unveil hidden patterns in data or groups of data. The analytical tools to unearth such novel information relate to clustering or the identification of sets in the database. Clustering is not rigorously defined, but it relates to the process of organizing data or objects in groups, the members of this groups share certain similarities.

Traditional approaches impose basic constraints on the shape of clusters in high dimensional spaces, and mostly deal with hyperspheres or divisions by hyperplanes, but this clearly limits the potential since such approaches will not find irregular clusters (Kuri-Morales, 2008). Using other distance functions and metrics would allow finding clusters of more complicated and irregular shapes. Stated in simple terms: if irregular clusters exist common methods will fail to find these. But, the corollary is even more important: if they exist and are not found, this means that the foundations of current technologies, based on hyperspheres and anisotropic spaces or subspaces, are not solid.

Indeed, it has been shown that the original Gielis Formula (i.e., the superformula of the '527 patent) could be used for such task (see Kuri-Morales, 2008). It provides a unifying mathematical description of natural shapes as diverse as, e.g., starfish, molecules and space-time models. Consequently, it is clear that anisotropical spaces are the rule in nature, rather than the exception. The superformula was originally developed in 2D and 3D but can be extended to any dimension. This, however, greatly increases the complexity and finding supershaped regions is a non-trivial task and difficult to handle as the number of dimensions grows. Classical Gielis curves and surfaces are not the only possible solution. Any plausible approach represents a kernel function. Irrespective of the kernel selected, one of the major problems to search for irregularly shaped clusters is that the clustering process is a highly non-linear and non-convex optimization problem, in many dimensions.

In Kuri Morales 2008, 2011, experiments are described how 10000 datapoints are distributed among 4 clusters in 3D space, with 2500 in each cluster. To reassign datapoints to the correct cluster, several supervised and unsupervised methods were used, methods commonly used in many algorithms in search methodologies. The results showed that K-means, Kohonen maps and Fuzzy C-means were much less efficient that Gielis surfaces, where the parameters were searched for using Genetic algorithms. These results were preliminary, but reasonable clustering was achieved for synthetic data where traditional clustering techniques perform poorly. The method is considered unique in the sense that it is the only one in which there are strictly no metric considerations involved. Therefore, it the only one guaranteed (in principle) to find an acceptable solution to problems such as the one corresponding to data set "C". However, several issues require attention in order for the method to attain practical generality. Among those, the fitness function has to be refined. It is not clear whether a simple strategy will be adequate. Second, the computational efficiency needs to be improved, since evolutionary algorithms are computationally intensive. An important issue indeed is when the number of clusters increases or the dimensions, which leads to a huge computational cost. Parallellizing algorithms and parallel processing could be a solution, since EA are parallelizable. Further, increasing computing power is becoming less restrictive due to developments in hardware.

But, the knowledge that was gained from these initial experiments is that this method will perform adequately where others simply will not do because of conceptual constraints. Further, since the validity is one maximizing the set of vectors lying in such clusters, there is no need for special validity measures, such verification of goodness of the clusters (Kuri-Morales 2011).

iii. Problem Statement

The original Gielis Formula displays some limitations since no absolute freedom of choice of the possible forms of the locus are involved. Alternative choices for the generating kernels could be rational functions, radial basis functions. Despite the choice of the basic kernel and the fact that membership functions hold the greater promise for clustering, the challenges are non-trivial. These focus on the computational cost associated with increased dimensions and systematic generalization to many dimensions. The major problem with Gielis Formula as a kernel is that it is thought to be extremely difficult to generalize to n-dimensional spaces. This is problematic since higher dimensional spaces are very common, running into thousands or even more of dimensions.

iv. Process

In some illustrative embodiments, the following process steps can be implemented.

Step 1: this step involves the input in a computer of data that needs to be analyzed for knowledge discovery (this data can be from a wide variety of fields and applications, such as, e.g., for example, data from airlines (e.g., airline trafficking), hospitals, insurances, banks or any type of data warehousing).

Step 2: this step involves using stochastic methods (for example evolutionary algorithms) in which an initial guess is made of anisotropic regions in the higher dimensional space. This can be done using methods outlined for object recognition, taking into account the fact that with each increase in dimension the complexity doubles, but it should also be known that 2D supershapes themselves are already a representation of higher dimensional spaces. As the simplest case of supershapes, Lamécurves $x^{\wedge n}+y^{\wedge n}=R^{\wedge n}$ represents the equality between three n-dimensional cubes.

Step 3: this step involves the refinement of the region description by using series expansions from previous group. The output are data regarding optimal division of spaces, representable in 2 or 3D graphs, generating new knowledge useful to increase and optimize efficiency in assorted applications (such as, e.g., by way of example, airline trafficking, bank and insurance matters, and assorted other applications). Notably, this is done much faster than with any other existing method.

v. Illustrative Datamining Implementations

In some illustrative embodiments, datamining can be applied within, e.g., an insurance company or other company that has collected through the years all data on its customers, products, sales and/or sales details, and stored this information digitally. In some embodiments, clustering can be used in various ways, e.g. 1) to find customer segments for product recommendation, or 2) knowledge discovery, which could lead to new insurance products, or 3) predict the probability of certain customers or customer groups to have car accidents.

In some embodiments, a data warehouse is implemented that includes tables with many entries with data (such as, e.g., including information related to, e.g., age, locality, gender, profession, etc.). After the step of preprocessing, the datawarehouse is generated, from which clustering tasks can be performed. For example, for product recommendations, new clients' data can be sent to an application server. After data-preprocessing, a datawarehouse is generated, and, e.g., clustering can be used to predict the best possible product combinations for that client. Clustering results are evaluated to provide the best possible results. The results can further be refined by using thresholds and filters according to user defined parameters, which can yield particular subsets of the patterns resulting from datamining. These results or patterns are visualised on graphical displays. Finally, a recommendation is sent to sales person or a web-based tool.

The techniques of datamining and clustering can be used for knowledge discovery, where the complete datawarehouse of the insurance company is involved. The goal is to find new, unexplored and unexpected clusters, revealing common patterns related to geographical location, age, time of year, etc. The clustering algorithm searches for irregular clusters or clusters with a given anisotropy (such as, e.g., for example clusters which are starlike, or arranged in a pentagon and/or otherwise arranged). One great advantage of Equation 1 of the present invention is that irregular regions of any kind can be detected, which would otherwise escape discovery, using classical clustering algorithms, based on hyperspheres. The goodness of clustering is defined by rules related to maximizing the set of vectors lying in such clusters.

A next step comprises the comparison of results to classical algorithms and procedures determine the gain obtained from using irregular clusters. In the next step, the clustering is communicated to product development and marketing specialists, who then develop new products (e.g. insurance products).

In some other exemplary embodiments, a prediction model is used to predict the probability of certain accidents with cars happening in a certain region, in a certain time. In this illustrative example, the data are again arranged in a data warehouse, including, e.g., personal data, records of past accidents, specific characteristics of the car to be insured. This can be applied in many ways, from insuring houses in earth quake prone regions, to performance of the personnel of the insurance company and quality control on its products, etc.

In some embodiments, the same tool (e.g., a computer can be programmed with a software tool implementing mathematical principles set forth herein which can be applied to a variety of situations) can be used to improve datamining processes, such as, for example, regarding to search for patterns in behaviors (such as, e.g., in financial spending and/or saving), in fail rates and/or success rates of investments, and/or fails rates and/or success rates of new companies and/or in other applications. In some other embodiments, as with datamining methods, these methods can be used to forecast based upon historical data. In preferred embodiments, the algorithms are embedded into existing software and workflow of datamining, with a major aim to optimize results of datamining and related processes.

It should be appreciated that there are numerous applications of the present invention and that these are just some illustrative examples.

2. Optimal Geometry Generators

In some embodiments, in this regard, the present invention allows for a new design strategy, in which approaches such as Gielis surfaces and models and optimization are generalized in multidimensional search and variation spaces. Such strategies will need to include specific approaches such as genetic algorithms (GA). In recent years, there is an increased interest in the use of genetic algorithms for optimisation of shapes.

We consider the following multiobjective shape optimization minimize$\{f1(a,u1,\ldots,un),\ldots,fm(a,u1,.$ subject to $c1(a,u1)=0,\ldots,cn(a,un)=0$ $a[\,]U_{ad}.$ Here, a is the design variable and $U_{ad}$ is the set of admissible designs. There are several state variables $u1=u1(a),\ldots, un=un(a)$ to be optimized. They satisfy a set of state equations which may correspond to several disciplines. A major advantage is the ease with which GA's can be implemented in parallel or distributed computing environments.

d. Enhanced Computational Methods i. Problem Statement:

Many boundary-value problems (BVPs) arising in mathematical physics and electromagnetics are related to the Laplacian operator. Among them, it is worth mentioning those relevant to the Laplace and Poisson equations, the wave and Helmholtz equations, as well as the Schrodinger equation. However, most of the mentioned differential problems can be solved in explicit way only in canonical domains with special shape or symmetries. Different approaches based on boundary layer techniques, integral equation methods, conformal mappings, and least squares procedures, have been proposed in the scientific literature to overcome this limitation. This problem is attenuated for complex and compound domains in 2D and 3D.

ii. Solution

An original analytical approach, tracing back to the classical Fourier projection method can be developed. These methods have been pioneered in simply connected domain, referred to as starlike domains. It is novel to extend these methods to complex and compound domains as given by Equation 1.

iii. Process And Method

As an example, a solution is developed for solving the Dirichlet problem for the Laplace equation in complex two-dimensional domains whose boundaries are described by a k-type Gielis equation. Regular functions are considered for the boundary values, although the presented theory can be easily extended by assuming weakened hypotheses. See, e.g., above in this document at Section 8 encaptioned "Supplementary Material for Universal Natural Shapes . . . ". In an illustrative example, in order to assess the relevant technique, a suitable numerical procedure based on the computer-aided algebra tool Mathematica© has been developed.

The polar equation of the considered domain $\bar{D}$ is as follows:

$$\rho = R(\vartheta) = \frac{\left|\cos\frac{3\vartheta}{2}\right|}{\sqrt{\left|\cos\frac{3\vartheta}{2}\right|^2 + \left|\sin\frac{3\vartheta}{2}\right|^2}} + \frac{|\cos 2\vartheta|}{|\cos 2\vartheta| + |\sin 2\vartheta|} + \frac{\left|\sin\frac{5\vartheta}{2}\right|}{\sqrt{\left|\cos\frac{5\vartheta}{2}\right|^2 + \left|\sin\frac{5\vartheta}{2}\right|^2}} \quad (1)$$

Using the developed Fourier-based methodology for solving the Dirichlet problem relevant to the Laplace equation in Gielis domains, the following numerical results have been collected under the assumption the boundary values on $\partial \bar{D}$ are described by the function $f(x,y)=x+\cos y$. See, e.g., FIG. 5(C) discussed above which shows relative boundary error e, as function of the expansion order N of the Fourier-like partial sum representing the solution of the Dirichlet problem for the Laplace equation in the k-type Gielis domain described by equation (1). See also FIG. 5(B) discussed above which shows angular behavior of the Fourier-like partial sum $U_N$, $(1,\vartheta)$ with expansion order N=7 representing the solution of the Dirichlet problem for the Laplace equation in the k-type Gielis domain described by equation (1). See also FIG. 5(A) discussed above which shows a spatial distribution of the Fourier-like partial sum of order N=7 representing the solution of the Dirichlet problem for the Laplace equation in the k-type Gielis domain described by equation (1).

iv. Example: Meshfree Modeling

In some examples, the use of stretched co-ordinate systems, reducing a starlike domain to a unit circle, allows the application of the classical Fourier method to a wide set of differential problems in complex two dimensional normal-polar domains. In this way, closed-form solutions can be obtained by using suitable quadrature rules, so avoiding cumbersome numerical techniques such as finite-difference or finite-element methods. These methods can substitute for a wide variety of techniques used in the art, since it is now possible to compute BVP with derivatives of any order, on any domain, in two or three dimensions. The fields of application include electromagnetics, antenna and microwaveguide technology, building and CAD/CAE. The limited number of terms needed in the Fourier like partial sum is proof of the efficiency and rapid decline of the error term.

In addition, the limited number of terms needed in the Fourier like partial sum is proof of the efficiency and rapid decline of the error term and the direct representation by Equation 1 warrants a simple and accurate encoding of the data in specific storage formats.

According to some illustrative embodiments, meshfree modelling process steps can include the following.

In a first step, models are either made directly in CAD or other design software in which the equation is used directly, or data are transformed into Equation 1 data through analysis step.

In a second step, the use of meshing (problematic, but used widely in industry) is no longer needed, since any differential or difference equation can be computer directly on all shapes, simple or combined. For example, one could study vibrations or the distribution of heat on a bird-like plate of a shape similar to that shown in FIG. 5(A). In accordance with the results, changes to the model of the plate can be made, if necessary, to improve strength, to add more or different material, to modify colours or other characteristics of materials, and/or related to issues of production ensuring all models can effectively be produced, through traditional methods used in building or CAD or novel processes such as 3D printing or additive manufacturing.

Because the model is clearly defined, whereby thousands of shapes can be combined and computed, all information related to product data management or product life cycle analysis can seamlessly be integrated in any workflow. One of the reasons is the savings in memory obtained from these models, since in comparison to meshed models, file sizes are typically three orders of magnitude smaller than files currently used. This has a definite effect of a more efficient and less error prone work flow and improved product data management in fields like building, mechanics, electromagnetics, etc.

In the final step, this information can be used to operate machines, printers, or other devices to provide the desired output.

v. Example: Optimal Design of Certain Products (e.g., Antenna's, Microwaveguides, Diamond Cutters, Etc.).

The inverse method is to select the best possible shape adapted to a surrounding space. One may think of a specific antenna for specific rooms, or microwaveguide in airplanes and satellites. See, e.g., also Optimal Geometry Computing above for further details.

Typically the synthesis and optimization of shapes initiate from a design philosophy, with certain constraints regarding making, materials used, pricing, etc. In mechanical design, for example, one produces batteries that have volume constraints related to the product characteristics and design of that device. With this new method, the inverse route can be taken. Given certain surroundings, such as, e.g., a room, a building, an airplane, cavities, etc., the optimal shape of the device can be computed.

As an illustrative specific example, in the field of electromagnetics (e.g., involving antennas, microwaveguides, radars, etc.) such devices can be developed to optimize performance in a given environment. Process steps can include, in an illustrative embodiment, first that a room is scanned (i.e., a data set depicting the image of the room is obtained), with furniture and material specifications given. Next, an optimal shape of antenna or antenna arrays are obtained from the toolbox (i.e., a computer program is provided within a computer configured to apply the mathematical principles herein to said data set). In a final step, antennas can be constructed (i.e., tailor made for specific applications); for example, the computed data results can be used to operate machinery, such as, e.g., cutting tools, 2D or 3D printers, or other devices for single object production. Alternatively, the output data can be integrated with other data for the production of embedded applications or devices, such as, e.g., in relation to clothing, print boards, aeroplanes and satellites.

As another specific example, in the field of diamond cutting, a rough diamond in a first step scanned with devices using vision technology, X-ray tomography or other techniques. Typically, in the diamond industry, processes have been devised to compute the best possible way of cutting the best stone from this rough diamond with the least possible loss. With the present tool box (i.e., the computer implemented software tool), specific shapes can be computed that guarantee the greatest yield from the rough diamond. Such shapes can be, e.g., more general than classic diamonds cuts. In a final step, these optimal data can be used to operate laser cutting machines to cut the diamonds.

Note: Antenna Design

The system is to modify the shape of the antenna to modify directivity patterns. Using supershaped antenna several advantageous properties were found in this type of antennas, which were designed and tested on DRA antenna (Dialectric Resonator Antenna).

Main Advantages:
 1. High performance (wide bandwidth behavior);
 2. Focusing energy points is possible (leading to lower power consumption);
 3. Can be produced at very low cost (a few cents in mass production, PVC or similar);
 4. Possible reduction of health problems related to using cell phones.

From a Business Perspective:
 1. It is as powerful as our current routers and antennas, but very inexpensive to manufacture.
 2. The directivity of the EM waves allow for reducing power consumption considerably directing the waves only to the receiver.
 3. This can additionally be used to reduce health risks, by developing cell phone antennas where the wave patterns are directed away from the brain.
 4. The focus was on DRA antennas, but can be extended to any type of antenna.
 5. It can be used anywhere in the world for a wide variety of applications.

Prototype Manufacturing and Measurements:

Target application: Ultra Wide Band Indoor communication for multimedia services.

Selected DR Shape: Concave cross.

See example pictured in provisional application Ser. No. 61/356,836 incorporated herein by reference above, wherein (a, b, m, $n_1$, $n_2$, $n_3$)=(0.03, 0.03, 4, 0.5, 0.5, 0.5).

Experimental Prototype:

DR made of PVC (vinyl g=2.8). Coaxial (SMA) feed. Compact structure ($h_\delta$=2.7 cm); amenable to mass production (molding technology); very inexpensive.

Broad Scope of the Invention:

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of optimizing a shape of a product, comprising:
  a) providing a computer programmed to solve the following equation related to differential problems in a two dimensional domain whose boundary is described by a general k-type Gielis curve $$\rho = R(\vartheta) = \sum_{j=0}^{k} r_G(\vartheta; \gamma_j(\vartheta), m_j, a_j, b_j, n_{1j}, n_{2j}, n_{3j}),$$

where $r_G(\vartheta; \gamma(\vartheta), a, b, m, n_1, n_2, n_3) =$ $$\gamma(\vartheta) \cdot \left[ \left| \frac{1}{a} \cdot \cos\frac{m}{4}\vartheta \right|^{n_2} + \left| \frac{1}{b} \cdot \sin\frac{m}{4}\vartheta \right|^{n_3} \right]^{-1/n_1}$$

denotes an ordinary Gielis polar equation modulated by a smooth function $\gamma(\theta)$, wherein a, b, $n_1$, $n_2$, $n_3$ and m are finite real numbers, and $n_1$, a and b≠0, b) storing a data set depicting an environment related to the product, c) using the computer to determine an optimal shape in relation to said data set with said equation, and d) constructing the product with an optimal shape based on said optimal shape determined in said step c).

2. The method of claim 1, further including using the computer tool box to synthesize shapes using said equation along with linear interpolation between terms.

3. The method of claim 1, further including using the computer tool box to synthesize k-type curves using said equation.

4. The method of claim 1, wherein said product is an antenna.

5. The method of claim 4, wherein said antenna is a dielectric resonator antenna.

6. The method of claim 4, wherein said antenna is made of a plastic.

7. The method of claim 6, wherein said antenna is made of PVC.

8. The method of claim 7, wherein said antenna is a dielectric resonator antenna.

9. The method of claim 4, wherein said optimal shape of said antenna optimizes a directivity pattern of said antenna.

10. The method of claim 4, wherein said optimal shape of said antenna includes a concave cross-section.

11. A system for optimizing a shape of a product, comprising:

a) a computer programmed to solve the following equation related to differential problems in a two dimensional domain whose boundary is described by a general k-type Gielis curve $$\rho = R(\vartheta) = \sum_{j=0}^{k} r_G(\vartheta; \gamma_j(\vartheta), m_j, a_j, b_j, n_{1j}, n_{2j}, n_{3j}),$$

where $r_G(\vartheta; \gamma(\vartheta), a, b, m, n_1, n_2, n_3) =$ $$\gamma(\vartheta) \cdot \left[ \left| \frac{1}{a} \cdot \cos\frac{m}{4}\vartheta \right|^{n_2} + \left| \frac{1}{b} \cdot \sin\frac{m}{4}\vartheta \right|^{n_3} \right]^{-1/n_1}$$

denotes an ordinary Gielis polar equation modulated by a smooth function $\gamma(\theta)$, wherein a, b, $n_1$, $n_2$, $n_3$ and m are finite real numbers, and $n_1$, a and b≠0, b) a database storing a data set depicting an environment related to the product, c) said computer being configured determine an optimal shape in relation to said data set using said equation.

12. The system of claim 11, further including the computer being configured to synthesize shapes using said equation along with linear interpolation between terms.

13. The system of claim 11, further including the computer being configured to synthesize k-type curves using said equation.

* * * * *